(12) United States Patent
Sato

(10) Patent No.: US 12,022,035 B2
(45) Date of Patent: Jun. 25, 2024

(54) DISPLAY CONTROL METHOD AND DISPLAY CONTROL APPARATUS

(71) Applicant: RSA Technologies LLC, Kanagawa (JP)

(72) Inventor: Atsushi Sato, Kanagawa (JP)

(73) Assignee: RSA TECHNOLOGIES LLC, Kanagawa (JP)

( * ) Notice: Subject to any disclaimer, the term of this patent is extended or adjusted under 35 U.S.C. 154(b) by 0 days.

(21) Appl. No.: 17/979,317

(22) Filed: Nov. 2, 2022

(65) Prior Publication Data
US 2023/0199126 A1    Jun. 22, 2023

(30) Foreign Application Priority Data
Dec. 17, 2021  (JP) ................. 2021-205086

(51) Int. Cl.
*G06F 17/00* (2019.01)
*G06F 3/0483* (2013.01)
(Continued)

(52) U.S. Cl.
CPC ....... *H04N 1/00432* (2013.01); *G06F 3/0483* (2013.01); *G06F 3/0484* (2013.01); *G06F 3/04842* (2013.01); *H04N 1/00429* (2013.01)

(58) Field of Classification Search
CPC ............ H04N 1/00432; H04N 1/00429; G06F 3/0483; G06F 3/0484; G06F 3/0482; G06F 4/0483; G06F 3/04842; G06F 3/0486
See application file for complete search history.

(56) References Cited

U.S. PATENT DOCUMENTS 7,203,701 B1 * 4/2007 Packebush ............ G06F 16/904
                                                    715/713
7,249,328 B1 * 7/2007 Davis .................... G06F 40/106
                                                    715/210
(Continued)

FOREIGN PATENT DOCUMENTS

CN       114154031 A  *  3/2022
CN       117472372 A  *  1/2024
(Continued)

OTHER PUBLICATIONS

Power, Christopher, et al, "No Going Back: an Interactive Visualization Application for Trailblazing on the Web", IEEE 12th International Conference Information Visualization, Jul. 1, 2008, pp. 133-142. (Year: 2008).*

(Continued)

*Primary Examiner* — Laurie A Ries
(74) *Attorney, Agent, or Firm* — Alley IP

(57) ABSTRACT

An apparatus that is able to control a screen executes an area display step to display a tab display area and a content display area, a target display step that is able to display, in response to a display target tab being selected from one or more tabs, a display target content item associated with the display target tab in the content display area, and a tab adding step that is able to update, in response to a request to add an additional content item, the tab display area so as to display an additional tab associated with the additional content item, wherein the tab adding step is able to update the display of the tab display area such that the additional tab appears as a child node of the display target tab in the tree view.

9 Claims, 12 Drawing Sheets

(51) Int. Cl.
*G06F 3/0484* (2022.01)
*G06F 3/04842* (2022.01)
*H04N 1/00* (2006.01)

(56) References Cited

U.S. PATENT DOCUMENTS

| | | | | |
|---|---|---|---|---|
| 7,363,583 | B1* | 4/2008 | Costa | G06Q 10/10 |
| | | | | 715/734 |
| 7,363,593 | B1* | 4/2008 | Loyens | G06F 16/26 |
| | | | | 715/713 |
| 7,870,503 | B1* | 1/2011 | Levy | G06F 40/103 |
| | | | | 715/788 |
| 7,979,808 | B2* | 7/2011 | Stiso | G06F 3/0482 |
| | | | | 370/408 |
| 9,411,794 | B2* | 8/2016 | Shima | G06F 3/0483 |
| 10,182,169 | B2* | 1/2019 | Tokiwa | H04N 1/00464 |
| 10,261,659 | B2* | 4/2019 | Ramanathan | G06F 3/04842 |
| 11,227,105 | B1* | 1/2022 | Samadani | G06F 3/04883 |
| 2002/0126153 | A1* | 9/2002 | Withers | G06F 3/0482 |
| | | | | 715/773 |
| 2003/0204811 | A1* | 10/2003 | Dam | G06F 16/958 |
| | | | | 715/255 |
| 2004/0143582 | A1* | 7/2004 | Vu | G06F 16/9027 |
| 2005/0246352 | A1* | 11/2005 | Moore | G06F 16/10 |
| 2006/0173927 | A1* | 8/2006 | Beyer | G06F 16/9027 |
| 2007/0027884 | A1* | 2/2007 | Heger | G06F 16/2246 |
| 2010/0017876 | A1* | 1/2010 | Chusing | G06F 21/6218 |
| | | | | 726/21 |
| 2010/0114916 | A1* | 5/2010 | Cooke | G06F 16/954 |
| | | | | 707/E17.014 |
| 2013/0007671 | A1* | 1/2013 | Hammontree | G06F 8/33 |
| | | | | 715/853 |
| 2014/0059488 | A1* | 2/2014 | El-Jayousi | G06F 3/0482 |
| | | | | 715/823 |
| 2014/0282118 | A1* | 9/2014 | Kumamoto | G06F 3/0481 |
| | | | | 715/760 |
| 2015/0278273 | A1* | 10/2015 | Wigington | G06F 16/904 |
| | | | | 707/797 |
| 2015/0341981 | A1* | 11/2015 | Gallo | G06F 3/0484 |
| | | | | 702/188 |
| 2016/0171081 | A1* | 6/2016 | Kong | G06F 16/285 |
| | | | | 707/797 |
| 2017/0357729 | A1* | 12/2017 | Romanenko | G06F 3/048 |
| 2021/0209689 | A1* | 7/2021 | Decanini | G06Q 40/06 |

FOREIGN PATENT DOCUMENTS

| | | | | |
|---|---|---|---|---|
| GB | 2373978 A | * | 10/2002 | G06F 16/954 |
| JP | H10-21042 | | 1/1998 | |
| JP | 2000-148645 | | 5/2000 | |
| JP | 2001-331356 | | 11/2001 | |
| JP | 2002-182891 | | 6/2002 | |
| JP | 2004-240539 | | 8/2004 | |
| JP | 2012-159970 | | 8/2012 | |
| WO | WO-2016156948 A1 | * | 10/2016 | G06F 16/95 |
| WO | WO-2021174329 A1 | * | 9/2021 | G06F 16/13 |

OTHER PUBLICATIONS

JPO, Notice of Reasons for Refusal in corresponding JP Application 2021-205086, Jul. 5, 2022.

* cited by examiner

FIG. 2
(CONTENT LIST 121)
| CONTENT ID | CONTENT ITEM | TREE STRUCTURE INFORMATION | | | |
|---|---|---|---|---|---|
| | | PARENT ID | CHILD ID | | |
| | | | FIRST CHILD ID | SECOND CHILD ID | .. |
| C0001 | WHAT IS TREE STRUCTURE 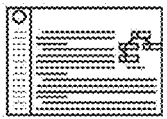 | N/A | C0011 | C0012 | .. |
| C0002 | WHAT IS TAB BROWSER 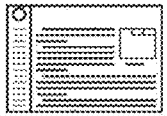 | N/A | C0021 | C0022 | .. |
| : | : | : | : | : | : |
| C0011 | WHAT IS DIRECTED TREE 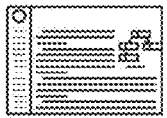 | C0001 | C0111 | C0112 | .. |
| : | : | : | : | : | : |
| C0021 | HISTORY: TAB BROWSER 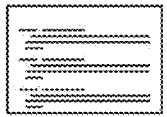 | C0002 | C0211 | N/A | .. |
| : | : | : | : | : | : |
| C0111 | DIRECTED GRAPH AND UNDIRECTED GRAPH  | C0011 | N/A | N/A | .. |
| : | : | : | : | : | : |

DISPLAY CONTROL METHOD AND DISPLAY CONTROL APPARATUS

RELATED APPLICATIONS

This application claims priority under 35 U.S.C. § 119 to Japanese Application 2021-205086, filed Dec. 17, 2021, which is incorporated by reference herein in its entirety.

FIELD

The embodiment discussed herein relates to a display control method and display control apparatus.

BACKGROUND

For displaying content items that are, for example, web pages and others, tab browsers are used, which enables displaying a plurality of web pages associated with tabs within one window. A tab browser displays tabs associated with information contained in web pages. In response to any of the tabs being selected, the tab browser displays a web page associated with the selected tab. With this, the user of the tab browser is able to select a desired web page from a plurality of web pages to display the selected web page.

By the way, a plurality of web pages that are displayed by a tab browser may be related to each other. Therefore, there is a demand to use the tab browser on the basis of the relationship between the plurality of web pages. However, as the number of web pages displayed by the tab browser increases, the user of the tab browser finds it difficult to grasp such relationship and use the tab browser on the basis of the grasped relationship. To address this difficulty, there is a demand for a means to support the use of the tab browser based on the relationship between a plurality of web pages.

As to a means to support the use of a tab browser based on the relationship between a plurality of web pages, Japanese Laid-open Patent Publication No. 2012-159970 discloses an image processing program that causes a computer that has a web page display means, which is a means to display a plurality of web pages represented by a plurality of web page data provided by the providers of the web page data on the basis of the plurality of web page data using a plurality of tabs within one window displayed on a display screen and which is designed to accept selection of one of the plurality of tabs as an active tab, set tabs other than the active tab as inactive tabs, and display the web page corresponding to the active tab on the display screen, to function as an extraction means for extracting an inactive tab related to the active tab from the inactive tabs and a display means for displaying the web page corresponding to the inactive tab extracted by the extraction means, together with the web page corresponding to the active tab, in a reduced size on the display screen.

The technique disclosed in Japanese Laid-open Patent Publication No. 2012-159970 displays, on the display screen, only web pages related to the displayed active tab among at least one web page corresponding to the inactive tabs that are not displayed, to thereby enhance user friendliness.

Please see, for example, Japanese Laid-open Patent Publication No. 2012-159970.

For using a tab browser on the basis of the relationship between a plurality of web pages, there is a demand for a means to support the selection of a tab (also referred to as an "inactive tab") corresponding to a web page that is not displayed but is related to a display target web page, which is equivalent to a web page corresponding to an active tab, and display of that web page. The technique disclosed in Japanese Laid-open Patent Publication No. 2012-159970 merely displays, on the display screen, only web pages related to an active tab among at least one web page corresponding to inactive tabs in order to enhance user friendliness, and therefore has room for improvement in terms of supporting the selection of a tab corresponding to another web page related to a display target web page and display of the other web page.

SUMMARY

The present disclosure has been made to solve the foregoing problems of the prior art and intends to provide a means to make it easy to grasp the relationship between a plurality of content items such as web pages and also to add, select, and display another content item related to a display target content item.

The inventor of the present disclosure has found out, as a result of intensive study to solve the above problems, that the problems are solvable by making it possible to display tabs in a tree view and add, when adding an additional content item, a tab associated with the additional content item as a child node of the tab associated with a content item currently displayed, and to perform other functions, and has completed the present disclosure. More concretely, the present disclosure provides the following.

A first aspect of the present disclosure provides a non-transitory computer-readable storage medium storing a display control program that enables an apparatus that is able to control a screen to execute: an area display step that is able to display, on the screen, a tab display area that is able to display one or more tabs associated with one or more content items in a tree view and a content display area that is able to display any of the one or more content items; a target display step that is able to display, in response to a display target tab being selected from the one or more tabs, a display target content item associated with the display target tab in the content display area; and a tab adding step that is able to update, in response to an addition request to add an additional content item, the tab display area so as to display an additional tab associated with the additional content item, wherein the tab adding step is able to update display of the tab display area such that the additional tab appears as a child node of the display target tab in the tree view.

According to the first aspect of the present disclosure, a user of the apparatus is able to select any of the tabs displayed in the tree view in the tab display area to display the display target content item associated with the selected display target tab in the content display area. Thus, even when there are many content items, the user is able to easily grasp the relationship between the content items using the tree view, which is suitable to represent the hierarchical structure of a plurality of elements. The user is then able to easily select and display another content item related to the display target content item on the basis of the relationship between the content items grasped using the tree view.

By the way, there is a demand to add another content item related to a content item currently displayed during viewing of the displayed content item. Examples of an additional content item to be added in response to an addition request based on such a demand include a content item that is equivalent to a material related to a display target content item currently displayed, a content item that is provided by the same provider as the content item currently displayed, a content item that is introduced in the content item currently displayed, and other content items. Such an additional content item tends to have stronger relationship with the display target content item than with content items that are not display targets.

According to the first aspect of the present disclosure, it is possible to update the display of the tab display area such that the additional tab appears as a child node of the display target tab in the tree view. That is, it is possible to represent the strong relationship between the display target content item currently displayed and the additional content item associated with the additional tab using a parent-child relationship in the tree view. Therefore, the user is able to easily select such another additional content item related to the display target content item on the basis of the parent-child relationship in the tree view. In addition, the user is able to add the additional tab such as to represent the strong relationship with the display target content item, without specifying a specific position and others for adding the additional tab.

Thus, the first aspect of the present disclosure is able to provide a means that makes it easy to grasp the relationship between a plurality of content items such as web pages and also to add, select, and display another content item related to a display target content item.

A second aspect of the present disclosure according to the first aspect provides the non-transitory computer-readable storage medium storing the display control program that enables the apparatus to execute a tree editing step that is able to edit a tree structure of the tree view.

There is a case where, after another content item related to a content item currently displayed is added, the added content item is found to be related to a content item that is not currently displayed. There may also be a case where many tabs appear in the tab display area as a result of repeatedly adding a content item and this rather causes difficulty in grasping the relationship between the content items.

According to the second aspect of the present disclosure, the user is able to edit the tree structure of the tree view. Examples of the editing here include moving the tab associated with a content item strongly related to a content item that is not a display target to an appropriate position, removing the tab associated with an unneeded content item, and other processes. Therefore, the user is able to edit the tree structure to make it easy to grasp the relationship between content items.

Thus, the second aspect of the present disclosure is able to provide a means that makes it easy to grasp the relationship between a plurality of content items such as web pages and also to add, select, and display another content item related to a display target content item.

A third aspect of the present disclosure according to the second aspect provides the non-transitory computer-readable storage medium storing the display control program, wherein the tree editing step is able to remove a removal target tab and one or more tabs corresponding to the descendant nodes of the removal target tab in the tree structure.

There may be a case where many tabs appear in the tab display area as a result of repeatedly adding a content item and this rather causes difficulty in grasping the relationship between the content items. According to the third aspect of the present disclosure, the user is able to perform editing to remove the tab associated with an unneeded content item. Therefore, the user is able to remove the tab associated with an unneeded content item to make it easy to grasp the relationship between content items.

According to the third aspect of the present disclosure, the user is able to remove, in addition to the removal target tab, one or more tabs corresponding to the descendant nodes of the removal target tab. That is, the user is able to remove not only the tab associated with an unneeded content item but also the tabs that correspond to the descendant nodes strongly related to the tab all together. Therefore, the user is able to collectively remove a plurality of tabs associated with unneeded content items to make it much easier to grasp the relationship between content items.

Thus, the third aspect of the present disclosure is able to provide a means to make it easy to grasp the relationship between a plurality of content items such as web pages and also to add, select, and display another content item related to a display target content item.

A fourth aspect of the present disclosure according to the second or third aspect provides the non-transitory computer-readable storage medium storing the display control program, wherein the tree editing step is able to move a movement target tab and one or more tabs corresponding to the descendant nodes of the movement target tab in the tree structure.

There is a case where, after another content item related to a content item currently displayed is added, the added content item is found to be related to a content item that is not currently displayed. According to the fourth aspect of the present disclosure, the user is able to perform editing to move the tab associated with the content item strongly related to the content item that is not a display target to an appropriate position.

According to the fourth aspect of the present disclosure, the user is able to move, in addition to the movement target tab, one or more tabs corresponding to the descendant nodes of the movement target tab. That is, the user is able to collectively move a plurality of tabs associated with a plurality of content items strongly related to a content item that is not a display target to an appropriate position.

Thus, the fourth aspect of the present disclosure is able to provide a means that makes it easy to grasp the relationship between a plurality of content items such as web pages and also to add, select, and display another content item related to a display target content item.

A fifth aspect of the present disclosure according to any of the first to fourth aspects provides the non-transitory computer-readable storage medium storing the display control program that enables the apparatus to execute a tab display step that is able to update the display of the tab display area so as to display a hidden tab that does not appear in the tab display area.

There may be a case where many tabs associated with content items are created as a result of repeatedly adding a content item and therefore the tab display area is not able to display all the tabs. According to the fifth aspect of the present disclosure, the user is able to display a hidden tab that does not appear in the tab display area. Therefore, even when all tabs do not appear in the tab display area, the user is able to display a hidden tab that does not appear in the tab display area and select the tab.

Thus, the fifth aspect of the present disclosure is able to provide a means that makes it easy to grasp the relationship between a plurality of content items such as web pages and also to add, select, and display another content item related to a display target content item.

A sixth aspect of the present disclosure according to any of the first to fifth aspects provides the non-transitory computer-readable storage medium storing the display control program, wherein the one or more content items include one or more web pages.

A tab browser is used, which is able to display a plurality of web pages associated with tabs within one window. The tab browser displays tabs associated with information contained in the web pages. Then, in response to a certain tab being selected, the tab browser displays the web page associated with the selected tab.

A tab browser that is able to obtain web pages from a vast number of web pages available on a network may display much more web pages than displaying only offline content items. For this reason, the tab browser rather causes difficulty in grasping the relationship between these web pages, compared with the case of displaying only offline content items.

According to the sixth aspect of the present disclosure, the user of the apparatus is able to select any of tabs displayed in the tree view in the tab display area to display the web page or the like associated with the selected display target tab in the content display area. Therefore, the user is able to easily grasp the relationship between the web pages and others using the tree view, which is suitable to represent the hierarchical structure between a plurality of elements. The user is then able to easily select and display another web page or the like related to the display target web page or the like, on the basis of the relationship between the web pages and others grasped using the tree view.

By the way, in the case where a display target content is a web page, it is often demanded to add another web page related to the web page currently displayed during viewing of the displayed web page. Examples of a web page to be added in response to an addition request based on such a demand include a web page that is equivalent to a material related to a web page currently displayed, a web page that is provided by the same provider as the web page currently displayed, a web page that is introduced in the web page currently displayed, and other web pages. Such a web page has stronger relationship with the web page currently displayed than with web pages that are not currently displayed.

According to the sixth aspect of the present disclosure, it is possible to update the display of the tab display area such that the additional tab appears as a child node of the display target tab in the tree view. That is, it is possible to represent the strong relationship between the web page currently displayed and the web page associated with the additional tab using a parent-child relationship in the tree view. Therefore, the user is able to easily select such another additional web page related to the display target web page using the parent-child relationship in the tree view. In addition, the user is able to add the additional tab such as to represent the strong relationship with the web page currently displayed, without specifying a specific position and others for adding the additional tab.

Therefore, the sixth aspect of the present disclosure is able to provide a tab browser that makes it easy to grasp the relationship between web pages using a tree view and also to add, select, and display another web page related to a display target web page.

Thus, the sixth aspect of the present disclosure is able to provide a means that makes it easy to grasp the relationship between a plurality of content items such as web pages and also to add, select, and display another content item related to a display target content item.

The object and advantages of the present disclosure will be realized and attained by means of the elements and combinations particularly pointed out in the claims.

It is to be understood that both the foregoing general description and the following detailed description are exemplary and explanatory and are not restrictive of the present disclosure.

BRIEF DESCRIPTION OF DRAWINGS

FIG. 2 illustrates an example of a content list 121;

DETAILED DESCRIPTION

Hereinafter, one embodiment will be described in detail with reference to the accompanying drawings.

Apparatus 1

Figure 1:
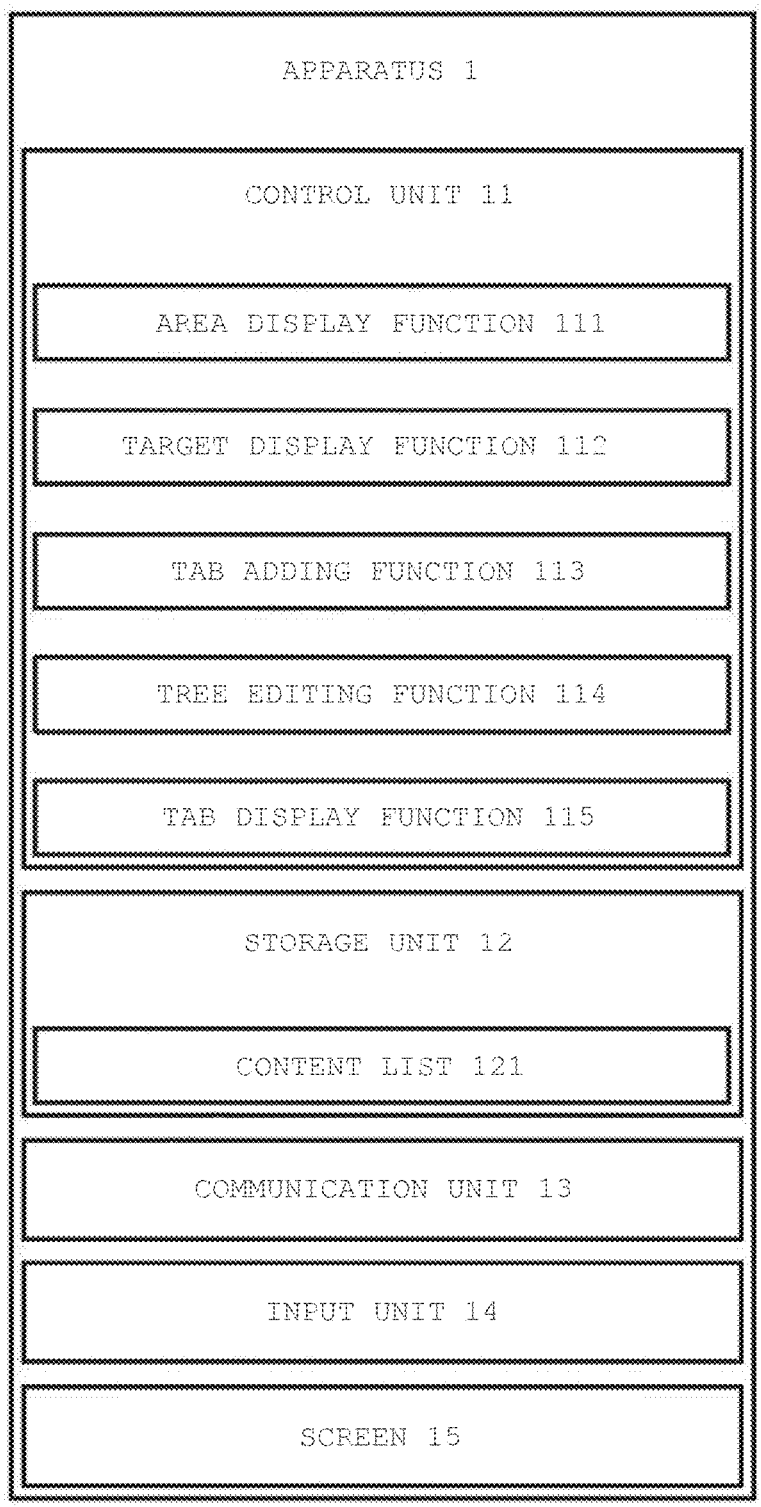
FIG. 1 is a block diagram illustrating an example of hardware and software configurations of an apparatus 1 according to one embodiment.

FIG. 1 is a block diagram illustrating an example of hardware and software configurations of an apparatus 1 according to one embodiment. In the following, an example of a preferred state of the hardware and software configurations of the apparatus 1 according to the present embodiment will be described with reference to FIG. 1.

The apparatus 1 includes a control unit 11, a storage unit 12, an input unit 14, a screen 15, and others. In addition to these, the apparatus 1 preferably includes a communication unit 13 that enables communication with external apparatuses over a network so that the apparatus 1 is able to display content items obtained from the outside over the network. Thereby, the apparatus 1 is able to control the screen 15 to display a vast number of web pages and others available on the network.

The apparatus 1 is not particularly limited, but examples thereof may include mobile terminals such as smartphones and tablet terminals, stationary type terminals such as personal computers, and others.

Control Unit 11

The control unit 11 includes a central processing unit (CPU), a random access memory (RAM), a read only memory (ROM), and others.

The control unit 11 is able to execute a display control program (may be called a "tab browser program") of the present embodiment in conjunction with the storage unit 12, communication unit 13, input unit 14, screen 15, and/or others as necessary so as to implement an area display function 111, a target display function 112, a tab adding function 113, a tree editing function 114, a tab display function 115, and others that are software components of the apparatus 1.

The display control program of the present embodiment is not particularly limited as long as it enables the apparatus 1 to display tabs in a tree view or the like. For example, the display control program may be a program that implements an independent application, a program that implements display of content items using tabs displayed in a tree view in conjunction with a program that implements another application, or another program.

Storage Unit 12

The storage unit 12 is a device that stores therein data and/or files, and has a data storage device such as a hard disk drive, a semiconductor memory, a storage medium, or a memory card. The storage unit 12 may be designed so as to be able to access a storage device or storage system such as a network attached storage (NAS), storage area network (SAN), cloud storage, a file server, and/or a distributed file system over the network. The storage unit 12 preferably includes a non-volatile storage device, which does not lose information stored therein when the power of the apparatus 1 is turned off. With this, the storage unit 12 is able to store information on a tree structure and others so as not to lose the information when the power of the apparatus 1 is turned off.

The storage unit 12 stores therein a control program that is executed by a microcomputer, the content list 121, and others. In the case where a tree view has many hierarchical levels, it would be difficult to grasp the relationship between content items. Therefore, the storage unit 12 preferably stores therein information on the maximum number of hierarchical levels indicating an upper limit for the number of hierarchical levels in the tree view, although this is not indispensable. By so doing, however, the apparatus 1 is able to prevent the number of hierarchical levels in the tree view from exceeding the maximum number of hierarchical levels and to avoid difficulty in grasping the relationship between content items.

Content List 121

The content list 121 stores one or more content items and tree structure information in association with each other.

The content list 121 is preferably able to store a content ID identifying a content item, information on the content item identified by the content ID, and others in association with each other. With this content list 121, the apparatus 1 is able to store and/or obtain information on a content item using a content ID.

Content items are not particularly limited but, for example, include one or more of the following: web pages obtained from web servers and others, a variety of documents, music files, image files, and video files stored in the file system of the apparatus 1, source codes obtained from repository servers, and others.

Especially, among these, the content items preferably include one or more web pages.

A tab browser that is able to obtain web pages from a vast number of web pages available on a network may display much more web pages than displaying only offline content items. For this reason, the tab browser or another means to display web pages may cause difficulty in grasping the relationship between the web pages, compared with the case of displaying only offline content items.

In the situation where the content items include one or more web pages, the apparatus 1 is able to provide a means that makes it easy to grasp the relationship between a plurality of content items such as web pages and also to add, select, and display another content item related to a display target content item.

Each content item is preferably able to be stored in association with network identity information identifying the content item on the network. Thereby, the apparatus 1 is able to update the content items using the network identity information. In addition, the user of the apparatus 1 is able to recommend the content items to his/her friends and others using the network identity information.

The network identity information is not particularly limited, but examples thereof include uniform resource locators (URLs), uniform resource identifiers (URIs), and others, which are associated with content items.

Each content item may be able to be stored in association with information on their creation. Information on the creation of a content item may be information on the creation time and others of the content item.

Each content item preferably includes text and/or image about the content item.

Text about a content item is not particularly limited, but examples thereof may include the title of the content item, the file name of the file corresponding to the content item, part of text contained in the content item, desired text associated with the content item by a user, and others.

In the situation where a content item includes text about the content item, the apparatus 1 is able to include the text in a tab. By virtue of this, the user of the apparatus 1 is able to identify one or more content items using such partial text. Therefore, the user is able to identify the display target tab associated with a display target content item that is desired to be displayed in the content display area RC. The user is then able to select the identified display target tab to display the display target content item in the content display area RC.

An image about a content item is not particularly limited, but examples thereof may include an icon image of the content item, part of an image and/or video contained in the content item, and others.

In the situation where a content item includes part of an image about the content item, the apparatus 1 is able to include the partial image in a tab. By virtue of this, the user of the apparatus 1 is able to identify one or more content items using such partial images. Therefore, the user is able to identify the display target tab associated with a display target content item that is desired to be displayed in the content display area RC. The user is then able to select the identified display target tab to display the display target content item in the content display area RC.

With respect to the tree structure information, a "collection of trees" of the present embodiment represents a graph structure (also called a "forest") without closed loops. Each graph that is connected and contains no closed loops in the collection of trees of the present embodiment is called a "tree." A tree included in the collection of trees of the present embodiment is a "rooted tree," which is able to define the hierarchical relationship between nodes with a node corresponding to the "root" as a base. In the collection of trees of the present embodiment, a "dot" (also called a "vertex" or "node") corresponds to a tab, and a "line" (also called an "edge") represents the relationship between tabs.

It is known that a collection of trees is a graph structure that is suitable to represent the hierarchical structure of a plurality of elements. Especially, it is known that a collection of trees including a rooted tree is a graph structure that is suitable to represent the hierarchical structure of a plurality of elements. Therefore, even in the case where there are many content items, the use of a collection of trees including rooted trees in the present disclosure enables the user to easily grasp the relationship between the content items using a tree view, which is suitable to represent the hierarchical structure of a plurality of elements. The user is then able to easily select and display another content item related to a display target content item on the basis of the relationship between the content items grasped using the tree view.

Since a collection of trees of the present embodiment corresponds to a graph structure without closed loops and is able to include a plurality of trees, the apparatus 1 is able to classify content items into the plurality of trees and represent the relationship between the content items for each tree.

The tree structure information includes, with respect to each content item, a "parent ID" identifying a content item corresponding to the parent node of the content item and "child IDs" identifying content items corresponding to the child nodes of the content item in the tree structure corresponding to a tree view.

The number of child IDs is not particularly limited to any value. Therefore, the tree structure information is able to represent a tree structure in which one node has a plurality of child nodes.

FIG. 2 illustrates an example of the content list 121. The content list 121 illustrated in FIG. 2 includes the following information that is identified by a content ID "C0001:"

"content item" regarding text titled "What is tree structure,"

"parent ID" indicating that there is no parent node (non-applicable (N/A) in FIG. 2), and "child ID" indicating that child nodes are a first a node identified by a first child ID "C0011" and a first b child node identified by a second child ID "C0012."

In addition, the content list 121 illustrated in FIG. 2 includes the following information that is identified by a content ID "C0011:"

"content item" regarding text titled "What is directed tree,"

"parent ID" indicating that a parent node is a content item identified by "C0001," and "child ID" indicating that child nodes are a first aa child node identified by a first child ID "C0111" and a first ab child node identified by a second child ID "C0112."

The content list 121 illustrated in FIG. 2 includes the above information identified by the content ID "C0001" and content ID "C0011." Therefore, the apparatus 1 is able to recognize that the content item identified by the content ID "C0001" is the highest-level content item corresponding to a root node in a tree structure and the content item identified by the content ID "C0011" is a child node of this root node. The apparatus 1 is thus able to display a tree view including a rooted tree with the content item identified by the content ID "C0001" as a root node.

Communication Unit 13

The communication unit 13 is not particularly limited as long as it enables the apparatus 1 to communicate with external apparatuses and others over a network. Examples of the communication unit 13 include wireless devices compatible with mobile telephone networks, wireless fidelity (Wi-Fi)-enabled devices based on IEEE802.11, near-field wireless devices compatible with Bluetooth (registered trademark) or the like, network cards compatible with the Ethernet, and others.

The external apparatuses are not particularly limited, but examples thereof may include content distribution apparatuses such as web servers, webcast servers, and repository servers, data storage such as cloud storage and NAS, and others.

Since the apparatus 1 includes the communication unit 13, the apparatus 1 is able to display content items obtained from the outside over the network. The apparatus 1 is thus able to control the screen 15 so as to display a vast number of web pages available on the network.

Input Unit 14

The input unit 14 is not particularly limited as long as it enables selecting a tab displayed in the tab display area RT and also requesting addition of an additional content item and other processes. The input unit 14 may include one or more of the following: character input tools that are, for example, a keyboard, audio input, and others, position specifying tools that are, for example, a mouse, trackball, touch panel, and others, and other tools.

Screen 15

The screen 15 is not particularly limited as long as it is able to display the tab display area RT and content display area RC. For example, the screen 15 may be configured using a conventional display device that is, for example, a cathode-ray tube display, a liquid crystal display, a touch panel display, an organic electroluminescent (EL) display, or another.

Main Flowchart of Display Control Process

Figure 3:
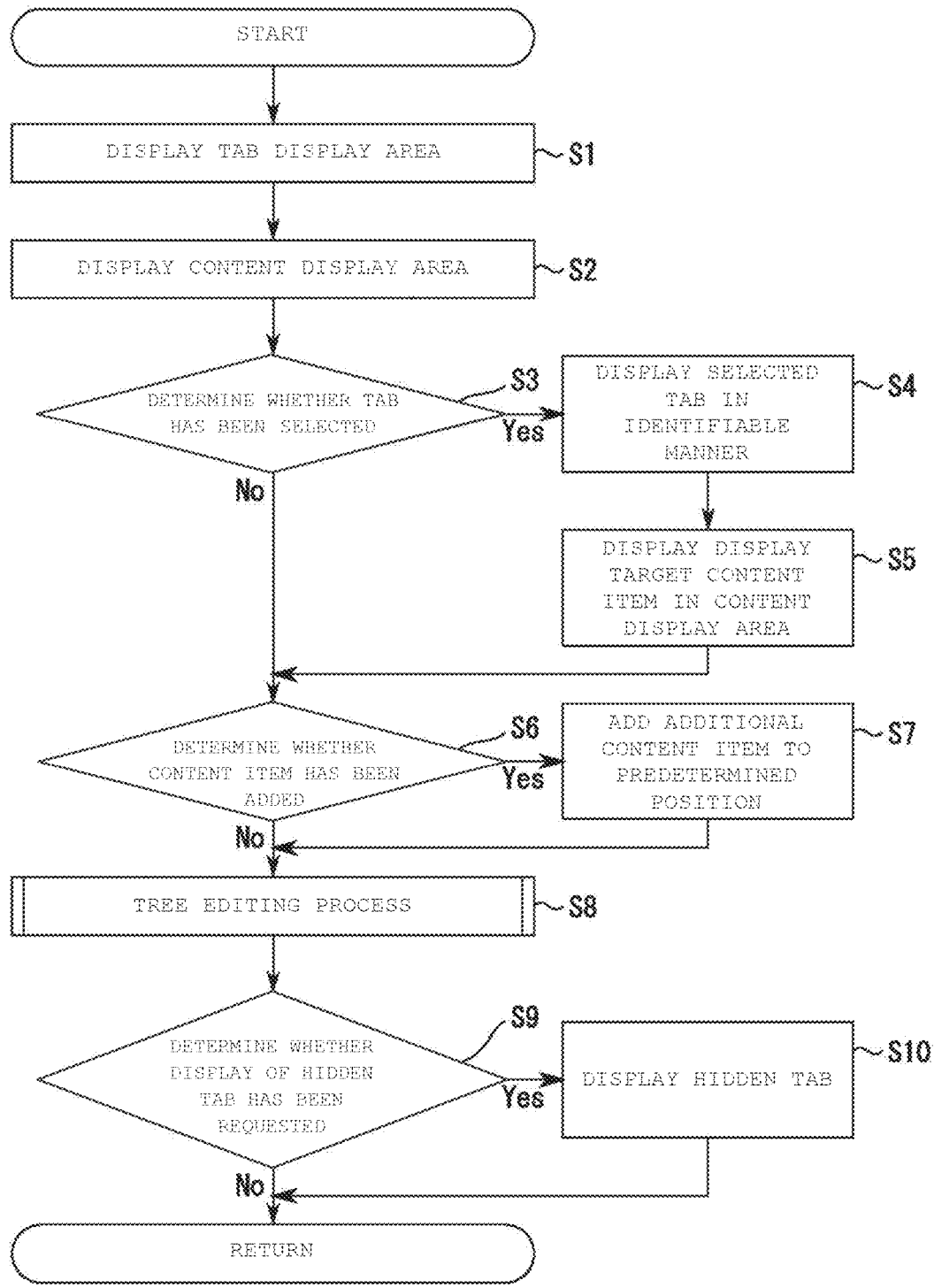
FIG. 3 is a main flowchart illustrating an example of a preferred flow of a display control process that is performed by the apparatus 1.

FIG. 3 is a main flowchart illustrating an example of a preferred flow of a display control process that is performed by the apparatus 1. The following describes an example of a preferred flow of the display control process that is performed by the apparatus 1 with reference to FIG. 3.

First, the apparatus 1 executes an area display step (steps S1 to S2) that is able to display the tab display area RT and the content display area RC on the screen 15. Here, the tab display area RT is able to display one or more tabs associated with one or more content items in a tree view, whereas the content display area RC is able to display any of the one or more content items.

Step S1: Display Tab Display Area

The control unit 11 executes the area display function 111 in conjunction with the storage unit 12 and the screen 15 to control the screen 15 so as to display the tab display area RT that is able to display one or more tabs associated with one or more content items in a tree view (step S1). The control unit 11 then moves to step S2.

The tab display area RT is not particularly limited as long as it is able to display one or more tabs based on the tree structure information stored in the content list 121 in a tree view.

Tab Display Mode

A tab display mode is not particularly limited as long as it is able to display tabs such that one or more content items listed in the content list 121 are identifiable. For example, the tab display mode may be a display mode of displaying one or more of the following: part of text about a content item, part of an image about the content item, a reduced thumbnail of the content item, and others. In addition, the tabs may include a blank tab that is not associated with any specific content item and that is able to have one or more tabs at the positions of its child nodes. With this, the user is able to associate a plurality of tabs with each other using a blank tab, without selecting a specific content item as a parent node, like folders in various file systems, in creating a tree structure.

Text about a content item is not particularly limited, but examples thereof may include the title of the content item, the file name of the file corresponding to the content item, part of text contained in the content item, desired text associated with the content item by a user, and others. In the case where the tabs include a blank tab, the text about the content item preferably includes text specified by the user. With this, the user is able to identify the blank tab and its child nodes using the specified text.

Since the tab display mode includes displaying part of text about a context item, the user of the apparatus 1 is able to identify one or more content items using such partial text. Therefore, the user is able to identify the display target tab associated with a display target content item that is desired to be displayed in the content display area RC. The user is then able to select the identified display target tab to display the display target content item in the content display area RC.

In the case where the content item associated with a tab is a web page, the tab display mode is preferably able to display the URL corresponding to the web page. By so doing, the user is able to identify the tab associated with the web page using the URL. The user is then able to select the identified tab to display the web page associated with the selected tab in the content display area RC. In the case where the tabs include a blank tab, the tab display mode preferably includes displaying a character string or another representing the blank tab, instead of a URL. By so doing, the user is able to identify the blank tab using the character string.

An image about a content item is not particularly limited, but examples thereof may include an icon image of the content item, part of an image and/or video contained in the content item, and others. In the case where the tabs include a blank tab, an image about a content item preferably includes an image specified by the user and/or a collection of reduced images of its one or more child nodes. By so doing, the user is able to identify the blank tab and its child nodes using the images.

Since the tab display mode includes displaying part of an image about a content image, the user of the apparatus 1 is able to identify one or more content items using such partial images. Thereby, the user is able to identify the display target tab associated with a display target content item that is desired to be displayed in the content display area RC. The user is then able to select the identified display target tab to display the display target content item in the content display area RC.

Since the tab display mode includes displaying a reduced thumbnail of a content item, the user of the apparatus 1 is able to identify one or more content items using such thumbnails. Therefore, the user is able to identify the display target tab associated with a display target content item that is desired to be displayed in the content display area RC. The user is then able to select the identified display target tab to display the display target content item in the content display area RC.

Tree Display Mode

A tree display mode is not particularly limited as long as it displays a tree view based on the tree structure information stored in the content list 121. This achieves a tab tree view that displays tabs in a tree view.

In the following, with respect to the tab associated with a certain content item listed in the content list 121, a tab corresponding to a "parent ID" in the tree structure information stored in the content list 121 may be referred to as a "parent tab" and/or "parent node." In addition, a tab corresponding to a "child ID" in the tree structure information stored in the content list 121 may be referred to as a "child tab" and/or "child node." Tabs sharing the same "parent ID" in the tree structure information stored in the content list 121 may be referred to as "sibling tabs" and/or "sibling nodes." A set including a plurality of tabs with the same "parent ID" in the tree structure information stored in the content list 121 may be referred to as a "sibling tab set" and/or "sibling node set." In addition, tabs that are reachable from a specified tab through child tabs may be referred to as "descendant tabs." Tabs that are reachable from a specified tab through parent tabs may be referred to as "ancestor tabs." The "distance" from a specified tab to another tab in the same tree is defined by a value obtained by adding one to the number of tabs passing through from the specified tab to the other tab.

The tree display mode preferably includes a mode of using a connecting element to connect a parent tab and a child tab. For example, the connecting element here is a line, an arrow, and/or another. With this, the user is able to identify the strength of the relationship between the content items associated with tabs using the connecting element. In addition, the tree display mode preferably includes coloring a display target tab, the ancestor tabs of the display target tab, the descendant tabs of the display target tab, and the other tabs in different colors. With this, the user is able to easily grasp the relationship between the display target tab and the other tabs using the colors.

The tree display mode preferably includes a mode of displaying the tabs included in a sibling tab set in a contiguous area that does not have tabs that are not included in the sibling tab set. By so doing, the user has no chance of confusion due to a mixture of the tabs that are included in the sibling tab set and are strongly related to each other and tabs that are not included in the sibling tab set and are weakly related to the tabs included in the sibling tab set. Thereby, the user is able to much more easily identify the strength of the relationship between the content items associated with tabs.

In the case where the tree display mode includes the mode of displaying the tabs included in a sibling tab set in a contiguous area that does not have tabs that are not included in the sibling tab set, the tree display mode preferably includes a mode of arranging and displaying the tabs included in the sibling tab set in a predetermined direction. With this, the user is able to much more easily identify the strength of the relationship between the content items associated with the tabs by viewing the tree view along the predetermined direction.

In the case where the tree display mode includes the mode of displaying the tabs included in a sibling tab set in a contiguous area that does not have tabs that are not included in the sibling tab set, the tree display mode preferably includes using a graphic element specifying that area. With this, the user is able to much more easily identify the strength of the relationship between the content items associated with the tabs using the graphic element.

The graphic element is not particularly limited, but examples thereof may include a closed curve (may be referred to as a "box") enclosing the area, a boundary (may be called a "border") lining the area, and others.

In the case where the tree display mode includes using the above graphic element, the connecting element may be an element that connects a parent tab and the graphic element. With this, the user is able to identify the strength of the relationship between the content item associated with a parent tab and the content items associated with its child tabs using the connecting element.

The tree display mode preferably includes a mode of arranging and displaying a display target tab, the parent tab of the display target tab, and the child tabs of the display target tab in a specific direction. With this, the user is able to much more easily identify the strength of the relationship between the content items associated with tabs by viewing the tree view along the specific direction.

The specific direction is not particularly limited, but preferably includes a direction from the top toward the bottom of the screen 15. With this, the apparatus 1 is able to display tabs in a tree view with a hierarchical structure in which the hierarchical level deepens from the top to toward the bottom. By virtue of this, the user is able to much more easily grasp the hierarchical structure of the content items.

In the case where the tree display mode includes the mode of arranging and displaying a display target tab, the parent tab of the display target tab, and the child tabs of the display target tab in a specific direction, the tree display mode preferably includes a mode of arranging and displaying tabs at the same hierarchical level of the tree structure in a direction substantially perpendicular to the specific direction. With this, the user is able to easily identify the parent-child relationship between a parent tab and its child tabs and the sibling relationship between a plurality of sibling tabs, using the arrangement directions. Therefore, the user is able to much more easily identify the strength of the relationship between the content items associated with the tabs.

The tree display mode preferably includes a mode of displaying tabs in a tree view so as not to display some tabs in the tab display area RT, depending on the size and others of the tab display area RT. This makes it possible to prevent many tabs from appearing in the small tab display area RT and thus to avoid difficulty in identifying the tabs.

The selection criteria for tabs to be displayed in the tab display area RT are not particularly limited but, for example, include one or more of the following: a selection criterion of selecting all tabs to display in the tab display area RT, a selection criterion of selecting tabs having parent-child relationship with a display target content item to display in the tab display area RT, a selection criterion of selecting tabs whose distances from the display target content are within a predetermined range to display in the tab display area RT, and other criteria.

In the case where the tree display mode includes the mode of displaying tabs in a tree view so as not to display some tabs in the tab display area RT, depending on the size and others of the tab display area RT, and the selection criteria for tabs to be displayed in the tab display area RT are selectable from the two or more selection criteria, the apparatus 1 is preferably able to provide a means to select a selection criterion for tabs to be displayed in the tab display area RT. By so doing, the user is able to select a selection criterion for tabs to be displayed in the tab display area RT according to use conditions.

The tree display mode preferably includes using a display element that is associated with display of hidden tabs that do not appear in the tab display area RT. With this, the user is able to request display of a hidden tab that does not appear in the tab display area RT using the display element. The display element is not particularly limited but, for example, may include one or more of the following: a scroll bar SB that enables requesting display of hidden tabs by scrolling the tab display area RT, a display button DB that enables requesting display of one or more corresponding tabs, and others.

In the case where the tree display mode includes the mode of displaying tabs in a tree view so as not to display some tabs in the tab display area RT, depending on the size and others of the tab display area RT, the apparatus 1 is preferably able to display, in a tree view, tabs corresponding to a predetermined number of hierarchical levels (for example, two levels) in the tree according to the size and others of the tab display area RT. By so doing, the user is able to confirm the tabs corresponding to the predetermined number of hierarchical levels that depends on the size and others of the tab display area RT. In the case where the apparatus 1 is able to display, in the tree view, the tabs corresponding to the predetermined number of hierarchical levels in the tree according to the size and others of the tab display area RT, the apparatus 1 is preferably able to provide a means to change the predetermined number of hierarchical levels via various operations that are, for example, a swipe operation, pinch in/pinch out operations, and others. By so doing, the user is able to change the predetermined number of hierarchical levels via such an operation to display a desired number of hierarchical levels and confirm tabs.

Step S2: Display Content Display Area

The control unit 11 executes the area display function 111 in conjunction with the storage unit 12 and screen 15 to control the screen 15 so as to display the content display area RC that is able to display a content item listed in the content list 121 (step S2). The control unit 11 then moves to step S3.

The position of displaying the content display area is not particularly limited, but may include one or more of the following: positions below, above, to the left of, and to the right of the tab display area RT on the screen 15.

Since the position of displaying the content display area RC includes the position below the tab display area RT on the screen 15, the user is able to select a content item that is desired to be displayed, using the tab display area RT displayed above the content display area RC, as with many tab browsers. Therefore, the user is able to easily select and display a content item that is desired to be displayed, using the tab display area RT.

Since the position of displaying the content display area RC includes the position above the tab display area RT on the screen 15, the user is able to select a content item that is desired to be displayed, using the tab display area RT displayed below the content display area RC, as with tab browsers that give tabs below content items. Therefore, the user is able to easily select and display a content item that is desired to be displayed, using the tab display area RT.

Full Screen Display of Tab Display Area

In the area display step, the apparatus 1 is preferably able to perform a tab full screen display of displaying the tab display area RT using the substantially entire area of the screen 15, although this is not indispensable. By so doing, however, the user is able to confirm tabs included in a much larger range in a tree view. Thereby, the user is able to entirely grasp the tabs displayed in a tree view. Timing to execute the tab full screen display is not particularly limited, but examples thereof include timing when the user requests the tab full screen display because the user desires to entirely grasp the tabs displayed in the tree view, timing when the user performs a tree editing process (to be described later), and other timing.

Subsequently, the apparatus 1 executes a target display step (steps S3 to S5) that is able to display the display target content item associated with a display target tab in the content display area RC in response to an operation of selecting the display target tab from one or more tabs.

Step S3: Determine Whether Tab has been Selected

The control unit 11 executes the target display function 112 in conjunction with the storage unit 12 and input unit 14 to determine whether any of the tabs displayed in the tab display area RT has been selected (step S3). If a tab is determined to have been selected, the control unit 11 moves to step S4; otherwise, the control unit 11 moves to step S6.

Step S4: Display Selected Tab in Identifiable Manner

The control unit 11 executes the target display function 112 in conjunction with the storage unit 12 and screen 15 to control the screen 15 so as to display the display target tab selected at step S3 in an identifiable manner (step S4). The control unit 11 then moves to step S5.

The process of displaying a selected display target tab in an identifiable manner is not particularly limited but, for example, may include one or more of the following: a procedure of changing the color of the display target tab, a procedure of blinking the display target tab, a procedure of giving a predetermined mark to the display target tab, and other procedures.

The process of displaying a selected display target tab in an identifiable manner preferably includes a procedure of moving the display target tab closer to a predetermined position that is, for example, the center, upper left part, or another of the tab display area RT. Thereby, the display target tab and tabs strongly related to the display target tab may collectively be displayed around the predetermined position. By so doing, the user is able to much more easily grasp the relationship between the display target tab and the tabs strongly related to the display target tab, collectively displayed around the predetermined position.

The process of displaying a selected display target tab in an identifiable manner preferably includes a procedure of displaying tabs strongly related to the display target tab in an identifiable manner. By so doing, the user is able to much more easily grasp the tabs strongly related to the display target tab. The procedure of displaying tabs strongly related to the display target tab in an identifiable manner is not particularly limited but, for example, may include one or more of the following: a procedure of changing the colors of tabs strongly related to the display target tab, a procedure of blinking the tabs strongly related to the display target tab, a procedure of giving a predetermined mark to the tabs strongly related to the display target tab, and other procedures.

The process of displaying a selected display target tab in an identifiable manner preferably includes a procedure of omitting the display of tabs weakly related to the display target tab. By so doing, the user is able to much more easily grasp tabs strongly related to the display target tab.

The procedure of omitting the display of tabs weakly related to the display target tab is not particularly limited but, for example, may include one or more of the following: a procedure of collectively displaying, as one tab, a plurality of tabs that are sibling tabs and are weakly related to the display target tab, and other procedures. Thereby, the apparatus 1 is able to represent the relationship between a plurality of tabs that are sibling tabs and have strong relationship, although the omission display is active.

The omission display of collectively displaying, as one tab, a plurality of tabs that are sibling tabs and are weakly related to a display target tab is preferably able to indicate the number of collected tabs in an identifiable manner. By so doing, the user is able to easily recognize the number of collected tabs.

Step S5: Display Display Target Content Item in Content Display Area

The control unit 11 executes the target display function 112 in conjunction with the storage unit 12 and screen 15 to control the screen 15 so as to display the display target content item associated with the display target tab selected at step S3 in the content display area RC (step S5). The control unit 11 then moves to step S6.

In the case where the apparatus 1 includes the communication unit 13 and the display target content item is a content item that is, for example, a web page or the like and is available from an external apparatus over a network, the process of controlling the screen 15 so as to display the display target content item in the content display area RC may include a procedure of obtaining information on the display target control item from the external apparatus over the network. By virtue of this, the apparatus 1 is able to display the display target content item updated based on the obtained information.

In the case where the display target content item is a web page, the process of displaying the display target content item in the content display area RC is preferably able to display an URL corresponding to the web page. By so doing, the user is able to identify the web page using the URL.

Further, the apparatus 1 executes a tab adding step (steps S6 to S7) that is able to update the tab display area RT so as to display an additional tab associated with an additional content item in response to an addition request to add the additional content item. In the case where information on the maximum number of hierarchical levels is stored in the storage unit 12 and the number of hierarchical levels in a tree view will exceed the maximum number of hierarchical levels due to the addition of the additional content item, the apparatus 1 preferably does not execute the tab adding step. Thereby, the apparatus 1 is able to set an upper limit for the number of hierarchical levels to be less than or equal to the maximum number of hierarchical levels and thus to avoid difficulty in grasping the relationship between content items. The method that invalidates the tab adding step is not particularly limited, but examples thereof include a method of disabling the display of an item corresponding to the content addition in a menu display for selecting various operations, and other methods.

Step S6: Determine whether content item has been added

The control unit 11 executes the tab adding function 113 in conjunction with the storage unit 12 and input unit 14 to determine whether a content item has been added (step S6). If a content item is determined to have been added, the control unit 11 moves to step S7; otherwise, the control unit 11 moves to step S8. In the case where information on the maximum number of hierarchical levels is stored in the storage unit 12, the process of determining whether a content item has been added preferably includes a process of determining that no content item has been added when the number of hierarchical levels in a tree view will exceed the maximum number of hierarchical levels due to the addition of the content item. With this, the apparatus 1 is able to set an upper limit for the number of hierarchical levels to be less than or equal to the maximum number of hierarchical levels and thus to avoid difficulty in grasping the relationship between content items.

Step S7: Add Additional Content Item to Predetermined Position

The control unit 11 executes the tab adding function 113 in conjunction with the storage unit 12 and screen 15 to perform a process of adding an additional tab associated with the additional content item added at step S6 to a predetermined position (step S7). The control unit 11 then moves to step S8.

The process of adding an additional tab to a predetermined position preferably includes a process of adding the additional tab as a child node of a display target tab. The process of adding an additional tab as a child node of a display target tab includes a process of storing the additional content item and tree structure information indicating that the additional content item has the content item associated with the display target tab as its parent node, in association with each other in the content list 121. With this, the apparatus 1 is able to add the additional tab as a child node of the display target tab. For the case where information on the maximum number of hierarchical levels is stored in the storage unit 12 and the number of hierarchical levels in a tree view will exceed the maximum number of hierarchical levels due to the addition of the additional tab as a child node of the display target tab, the process of adding an additional tab to a predetermined position is preferably able to add the additional tab to a position different from the position of a child node of the display target tab. With this, the apparatus 1 is able to set an upper limit for the number of hierarchical levels to be less than or equal to the maximum number of hierarchical levels and thus to avoid difficulty in grasping the relationship between content items. The process of adding an additional tab to a position different from the position of a child node of the display target tab is not particularly limited but, for example, may include one or more of the following: a procedure of adding to a position specified by a user, a procedure of adding to the position of a sibling tab of the display target tab, a procedure of adding as a root node, and other procedures. In the case where the process of adding an additional tab to a position different from the position of a child node of the display target tab includes two or more of the above procedures, the apparatus 1 is preferably able to provide a means that allows a user to specify a desired procedure. By so doing, the user is able to specify a procedure of adding an additional tab to a position different from the position of a child node of the display target tab.

The process of adding an additional tab to a predetermined position includes a process of updating the tree view in the tab display area RT such as to include the additional tab as a child node of the display target tab.

There is a demand to add another content item related to a content item currently displayed during viewing of the displayed content item. Examples of an additional content item to be added in response to an addition request based on such a demand may include a content item that is equivalent to a material related to a display target content item currently displayed, a content item that is provided by the same provider as the content item currently displayed, a content item that is introduced in the content item currently displayed, and other content items. Such an additional content item tends to have stronger relationship with the display target content item than with content items that are not display targets.

Since the process of adding an additional tab to a predetermined position includes the process of updating the tree view in the tab display area RT such as to include the additional tab as a child node of the display target tab, the apparatus 1 is able to represent the strong relationship between the display target content item currently displayed and the additional content item associated with the additional tab, using a parent-child relationship in the tree view. The user is then able to easily select such another additional content item related to the display target content item, using the parent-child relationship in the tree view. In addition, the user is able to add the additional tab such as to represent the strong relationship with the display target content item, without specifying a specific position and others for adding the additional tab.

The process of adding an additional tab to a predetermined position preferably includes a process of rejecting the addition of the additional tab depending on the number of tabs that depends on the size of the tab display area RT. This makes it possible to prevent many tabs from appearing in the small tab display area RT and thus to avoid difficulty in identifying each tab. The process of rejecting the addition of an additional tab preferably includes making a notification of this rejection. By so doing, the user is able to know that the additional tab has not been added.

The apparatus 1 is preferably able to perform the tree editing process (step S8, may be referred to as a "tree editing step") that is able to edit the tree structure of a tree view, although this is not indispensable.

There is a case where, after another content item related to a content item currently displayed is added, the added content item is found to be related to a content item that is not currently displayed. There may also be a case where many tabs appear in the tab display area RT as a result of repeatedly adding a content item and this rather causes difficulty in grasping the relationship between content items.

Since the apparatus 1 is able to perform the tree editing process, the user is able to edit the tree structure of a tree view. Examples of the editing here include moving the tab associated with a content item strongly related to a content item that is not a display target to an appropriate position, removing the tab associated with an unneeded content item, and other processes. Thereby, the user is able to edit the tree structure to make it easy to grasp the relationship between content items.

Step S8: Tree Editing Process

The control unit 11 executes the tree editing function 114 in conjunction with the storage unit 12, input unit 14, and/or screen 15 to perform the tree editing process that is able to edit the tree structure of a tree view of tabs in the tab display area RT (step S8, tree editing step). The control unit 11 then moves to step S9.

The tree editing process performed at step S8 will be described in detail later with reference to FIG. 4.

The apparatus 1 is preferably able to execute a tab display step (steps S9 to S10) that is able to update the display of the tab display area RT so as to display hidden tabs that do not appear in the tab display area RT, although this is not indispensable.

There may be a case where many tabs associated with content items are created as a result of repeatedly adding a content item and therefore the tab display area RT is not able to display all the tabs. The apparatus 1 is able to execute the tab display step, so that the user is able to display a hidden tab that does not appear in the tab display area RT. Thereby, even in the case where all tabs do not appear in the tab display area RT, the user is able to display a hidden tab that does not appear in the tab display area RT and select it.

Step S9: Determine Whether Display of Hidden Tab has been Requested

The control unit 11 executes the tab display function 115 in conjunction with the storage unit 12 and input unit 14 to determine whether display of a hidden tab that does not appear in the tab display area RT has been requested (step S9). If such a request is determined to have been made, the control unit 11 moves to step S10; otherwise, the control unit 11 moves to step S1 to repeat the process from step S1 to step S10.

The process of determining whether display of a hidden tab has been requested is not particularly limited but, for example, may include a procedure of determining that display of a hidden tab has been requested when an input operation is made using the display element displayed at step S1. With this, the user is able to request the display of a hidden tab that does not appear in the tab display area RT using the display element.

In the case where the input unit 14 includes a touch panel, the process of determining whether display of a hidden tab has been requested may include a procedure of determining that display of a hidden tab has been requested when the tab display area RT is swiped. With this, the user is able to request display of a hidden tab by scrolling the tab display area RT via a swipe, which is often performed as an input to request a scroll on a touch panel.

Step S10: Display Hidden Tab

The control unit 11 executes the tab display function 115 in conjunction with the storage unit 12 and screen 15 to perform a process of displaying a hidden tab requested to be displayed at step S9 (step S10). The control unit 11 then moves to step S1 to repeat the process from step S1 to step S10.

Content Change Step

The apparatus 1 is preferably able to execute a content change step that is able to change the content item associated with a tab, although this is not indispensable. By so doing, however, the user is able to change the content item associated with a tab.

History Display Step

In the case where the apparatus 1 is able to execute the content change step, the apparatus 1 is preferably able to execute a history display step that is able to display a history about changes of the content item associated with a tab, although this is not indispensable. By so doing, however, when the content item associated with a tab is changed, the user is able to confirm a history about the change.

Since the apparatus 1 is able to perform the display control process of steps S1 to S10, the user of the apparatus 1 is able to select any of the tabs displayed in a tree view in the tab display area RT to display the display target content item associated with the selected display target tab in the content display area RC. Even in the case where there are many content items, the user is able to easily grasp the relationship between the content items using the tree view, which is suitable to represent the hierarchical structure of a plurality of elements. The user is then able to easily select and display another content item related to the display target content item on the basis of the relationship between the content items grasped using the tree view.

By the way, there is a demand to add another content item related to a content item currently displayed during viewing of the displayed content item. Examples of an additional content item to be displayed in response to an addition request based on such a demand may include a content item that is equivalent to a material related to a display target content item currently displayed, a content item that is provided by the same provider as the content item currently displayed, a content item that is introduced in the content item currently displayed, and other content items. Such an additional content item tends to have stronger relationship with the display target content item than with content items that are not display targets.

The apparatus 1 is able to perform the display control process of steps S1 to S10. Thus, the apparatus 1 is able to update the display of the tab display area RT such as to include an additional tab as a child node of the display target tab in the tree view. That is, it is possible to represent the strong relationship between the display target content item currently displayed and the additional content item associated with the additional tab using a parent-child relationship in the tree view. The user is then able to easily select such another additional content item related to the display target content using the parent-child relationship in the tree view. In addition, the user is able to add the additional tab such as to represent the strong relationship with the display target content, without specifying a specific position and others for adding the additional tab.

As described above, the apparatus 1 is able to perform the display control process of steps S1 to S10. Thus, with respect to a plurality of various content items such as web pages, files on a file system, and others, the apparatus 1 makes it easy to grasp the relationship between the content items and also to add, select, and display another content item related to a display target content item.

In addition, since the apparatus 1 is able to perform the display control process of steps S1 to S10, the apparatus 1 is able to implement a tree structure-type node tree controller that is able to implement a tree structure-type node tree navigation for selecting and displaying content items via a tree structure-type node tree view that is designed to display tabs associated with a plurality of content items in a tree view.

Flowchart of Tree Editing Process

Figure 4:
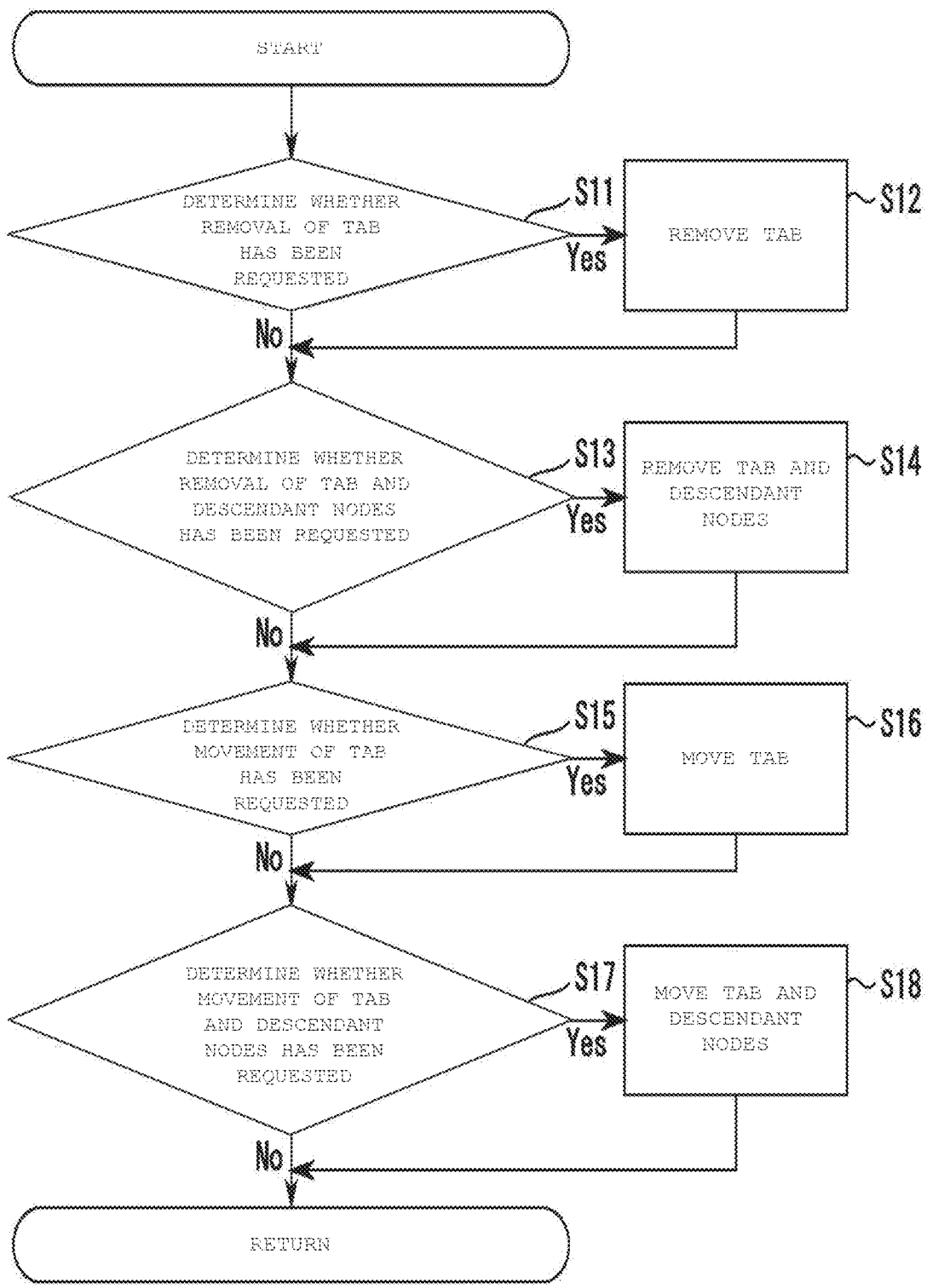
FIG. 4 is a flowchart illustrating an example of a preferred flow of a tree editing process that is performed at step S8 of FIG. 3.

FIG. 4 is a flowchart illustrating an example of a preferred flow of the tree editing process that is performed at step S8 of FIG. 3. The following will describe an example of a preferred flow of the tree editing process that is performed at step S8 of FIG. 3, with reference to FIG. 4.

Step S11: Determine Whether Removal of Tab has been Requested

The control unit 11 executes the tree editing function 114 in conjunction with the storage unit 12 and input unit 14 to perform a process of determining whether removal of a tab has been requested (step S11). If such a request is determined to have been made, the control unit 11 moves to step S12; otherwise, the control unit 11 moves to step S13.

The process of determining whether removal of a tab has been requested is not particularly limited, but examples thereof include a process of determining that removal of a tab has been requested when the removal of the tab is requested via a menu that is opened in response to an input operation to open the menu relating to the tab, a process of determining that removal of a tab has been requested when closing of the content item associated with the tab is requested, and other processes.

The input operation to open the menu relating to a tab is not particularly limited. In the case where the input unit 14 includes a touch panel, the input operation to open the menu relating to a tab preferably includes an input operation of holding the tab down. With this, the user is able to open the menu relating to the tab by performing an intuitive input operation of holding the tab down, which is often associated with an operation to open a menu.

Step S12: Remove Tab

The control unit 11 executes the tree editing function 114 in conjunction with the storage unit 12 and screen 15 to perform a process of removing the tab requested to be removed at step S11 (step S12). The control unit 11 then moves to step S13.

The process of removing a tab includes a process of removing, from the content list 121, the content item that is stored in the content list 121 and is associated with the removal target tab requested to be removed. In addition, the process of removing a tab includes a process of moving content items corresponding to the child nodes of the content item associated with the removal target tab to positions that are appropriate in the tree after the removal.

The process of moving content items corresponding to the child nodes of the content item associated with the removal target tab to positions that are appropriate in the tree after the removal is not particularly limited. The process of moving to appropriate positions preferably includes a process of moving such that, in the case where the removal target tab has a parent node, the parent node becomes the parent node of the content items corresponding to the child nodes of the removal target tab and a process of moving such that, in the case where the removal target tab does not have a parent node, the content items corresponding to the child nodes of the removal target tab become root nodes that do not have a parent node. With this, the apparatus 1 is able to move the content items corresponding to the child nodes of the content item associated with the removal target tab to positions that are intuitively appropriate in the tree after the removal.

There may be a case where many tabs appear in the tab display area RT as a result of repeatedly adding a content item and this rather causes difficulty in grasping the relationship between content items. By virtue of the process of removing a tab requested to be removed at step S11, the user is able to perform editing to remove the tab associated with an unneeded content item. Thus, the user is able to remove the tab associated with the unneeded content item to make it easy to grasp the relationship between content items.

The tree editing process preferably includes a partial tree removal process (steps S13 to S14) that is able to remove a removal target tab and one or more tabs corresponding to the descendant nodes of the removal target tab in a tree structure, although this is not indispensable.

There may be a case where many tabs appear in the tab display area RT as a result of repeatedly adding a content item and this rather causes difficulty in grasping the relationship between content items.

Since the tree editing process includes the partial tree removal process, the user is able to remove one or more tabs corresponding to the descendant nodes of the removal target tab in addition to the removal target tab. Therefore, the user is able to collectively remove not only the tab associated with an unneeded content item but also the tabs corresponding to the descendant nodes strongly related to the tab. Thus, the user is able to collectively remove a plurality of tabs associated with unneeded content items to make it much easier to grasp the relationship between content items.

Step S13: Determine Whether Removal of Tab and Descendant Nodes has been Requested The control unit 11 executes the tree editing function 114 in conjunction with the storage unit 12 and input unit 14 to perform a process of determining whether removal of a tab and its descendant nodes has been requested (step S13). If such a request is determined to have been made, the control unit 11 moves to step S14; otherwise, the control unit 11 moves to step S15.

The request to remove a tab and its descendant nodes may be the same as that to remove a tab at step S11. The process of determining whether removal of a tab and its descendant nodes has been requested preferably includes a process of determining that removal of a tab and its descendant nodes has been requested when the tab requested to be removed at step S11 has a child node. By so doing, the user is able to request removal of a tab and its descendant nodes in the same manner as a request to remove a leaf node that does not have child nodes.

Step S14: Remove Tab and Descendant Nodes

The control unit 11 executes the tree editing function 114 in conjunction with the storage unit 12 and input unit 14 to perform a process of removing the tab requested to be removed at step S13 and its descendant nodes (step S14). The control unit 11 then moves to step S15.

Step S15: Determine Whether Movement of Tab has been Requested

The control unit 11 executes the tree editing function 114 in conjunction with the storage unit 12 and input unit 14 to perform a process of determining whether movement of a tab has been requested (step S15). If such a request is determined to have been made, the control unit 11 moves to step S16; otherwise, the control unit 11 moves to step S17.

The request to move a tab includes at least information identifying a tab that is a movement target and information identifying a destination. Thereby, the apparatus 1 is able to identify the tab to be moved and move the tab to the destination.

The process of determining whether movement of a tab has been requested is not particularly limited, but examples thereof may include a process of determining that movement of a tab has been requested when the movement of the tab is requested via a menu that is opened in response to an input operation to open the menu relating to the tab, a process of determining that movement of a tab has been requested when the tab is dragged, and other processes.

The input operation to open the menu relating to a tab is not particularly limited, but may be the same as that to open the menu relating to a tab at step S13.

The destination is not particularly limited, but may be a position that does not have a parent tab or the position of a child tab of a specified tab.

Since the destination includes a position that does not have a parent tab, the user is able to move a tab weakly related to other content items to a position that does not have a parent tab. Therefore, the user is able to move the tab weakly related to other content items so as not to represent the relationship with the other tabs.

Since the destination includes the position of a child tab of a specified tab, the user is able to move a tab strongly related to the content item associated with a tab specified as a destination to the position of a child tab of the tab specified as the destination. Therefore, the user is able to move the movement target tab so as to represent the strong relationship between the content item associated with the movement target tab and the tab specified as the destination.

Step S16: Move Tab

The control unit 11 executes the tree editing function 114 in conjunction with the storage unit 12 and input unit 14 to perform a process of moving the tab requested to be moved at step S15 in accordance with the request (step S16). The control unit 11 then moves to step S17.

The process of moving a tab includes a process of updating the tree structure information of a content item that is stored in the content list 121 and is associated with the movement target tab requested to be moved. In addition, the process of moving a tab includes a process of moving the content items corresponding to the child nodes of the content item associated with the movement target tab to positions that are appropriate in the tree after the movement.

The process of moving the content items corresponding to the child nodes of the content item associated with the movement target tab to positions that are appropriate in the tree after the movement is not particularly limited, but preferably includes a process of moving such that, in the case where the movement target tab has a parent node, the parent node of the movement target tab becomes the parent node of the content items corresponding to the child nodes and a process of moving such that, in the case where the movement target tab does not have a parent node, the content items corresponding to the child nodes become root nodes that do not have a parent node. With this, the apparatus 1 is able to move the content items corresponding to the child nodes of the content item associated with the movement target tab to positions that are intuitively appropriate in the tree after the movement.

There is a case where, after another content item related to a content item currently displayed is added, the added content is found to be related to a content item that is not currently displayed. By virtue of the process of moving a tab requested to be moved at step S15 in accordance with the request, the user is able to perform editing to move the tab associated with a content item strongly related to a content item that is not a display target to an appropriate position.

The tree editing process preferably includes a partial tree movement process (steps S17 to S18) that is able to move a movement target tab and one or more tabs corresponding to the descendant nodes of the movement target tab in the tree structure, although this is not indispensable.

There is a case where, after another content item related to a content item currently displayed is added, the added content item is found to be related to a content item that is not currently displayed.

Since the tree editing process includes the partial tree movement process, the user is able to move, in addition to the movement target tab, one or more tabs corresponding to the descendant nodes of the movement target tab. That is, it is possible to collectively move a plurality of tabs associated with a plurality of content items strongly related to a content item that is not a display target to appropriate positions.

Step S17: Determine Whether Movement of Tab and Descendant Nodes has been Requested The control unit 11 executes the tree editing function 114 in conjunction with the storage unit 12 and input unit 14 to perform a process of determining whether movement of a tab and its descendant nodes has been requested (step S17). If such a request is determined to have been made, the control unit 11 moves to step S18; otherwise, the control unit 11 moves to step S9 (FIG. 3).

The request to move a tab and its descendant nodes is the same as that to move a tab at step S15. The process of determining whether movement of a tab and its descendant nodes has been requested preferably includes a process of determining that movement of a tab and its descendant nodes has been requested when the tab requested to be moved at step S15 has a child node. By so doing, the user is able to move a tab and its descendant nodes in the same manner as a request to move a leaf node that does not have child nodes.

Step S18: Move Tab and Descendant Nodes

The control unit 11 executes the tree editing function 114 in conjunction with the storage unit 12 and input unit 14 to perform a process of moving a tab requested to be moved at step S17 and its descendant nodes in accordance with the request (step S18). The control unit 11 then moves to step S9 (FIG. 3).

Tree Structure Saving Step

In the case where the storage unit 12 includes a non-volatile storage device, the apparatus 1 is preferably able to execute a tree structure saving step that saves the tree structure information stored in the content list 121 in the non-volatile storage device, although this is not indispensable. By doing so, however, the apparatus 1 is able to save the tree structure information so as not to lose it when the power of the apparatus 1 is turned off.

Tree Structure Reading Step

In the case where the apparatus 1 is able to execute the tree structure saving step, the apparatus 1 is preferably able to execute a tree structure reading step that reads tree structure information saved in the non-volatile storage device from the non-volatile storage device, although this is not indispensable. By doing so, however, the apparatus 1 is able to read the tree structure information from the non-volatile storage device and store it in the content list 121. Then, the apparatus 1 is able to display, in a tree view, tabs on the basis of the tree structure information held before the power of the apparatus 1 is turned off. That is, the apparatus 1 is able to restore a saved tab structure.

Blank Tab Adding Step

The apparatus 1 is preferably able to execute a blank tab adding step that is able to add a blank tab that is not associated with any content item, although this is not indispensable. By so doing, however, the user is able to add a blank tab and then associate a content item with the blank tab, so as to desirably operate the tree structure. The position of placing the additional blank tab is not particularly limited, but examples thereof may include the position of a root node, the position of a sibling node of a display target tab, the position of a child node of the display target tab, and other positions.

Use Case of Apparatus 1

The following describes a use case of the apparatus 1 according to the present embodiment.

Execution of Display Control Program

First, the user of the apparatus 1 causes the apparatus 1 to execute the display control program. The apparatus 1 displays the tab display area RT and the content display area RC on the screen 15.

The following describes various display modes that display the tab display area RT and content display area RC, with reference to drawings.

Display Mode of Connecting Tabs Including Text with Arrows

Figure 5:
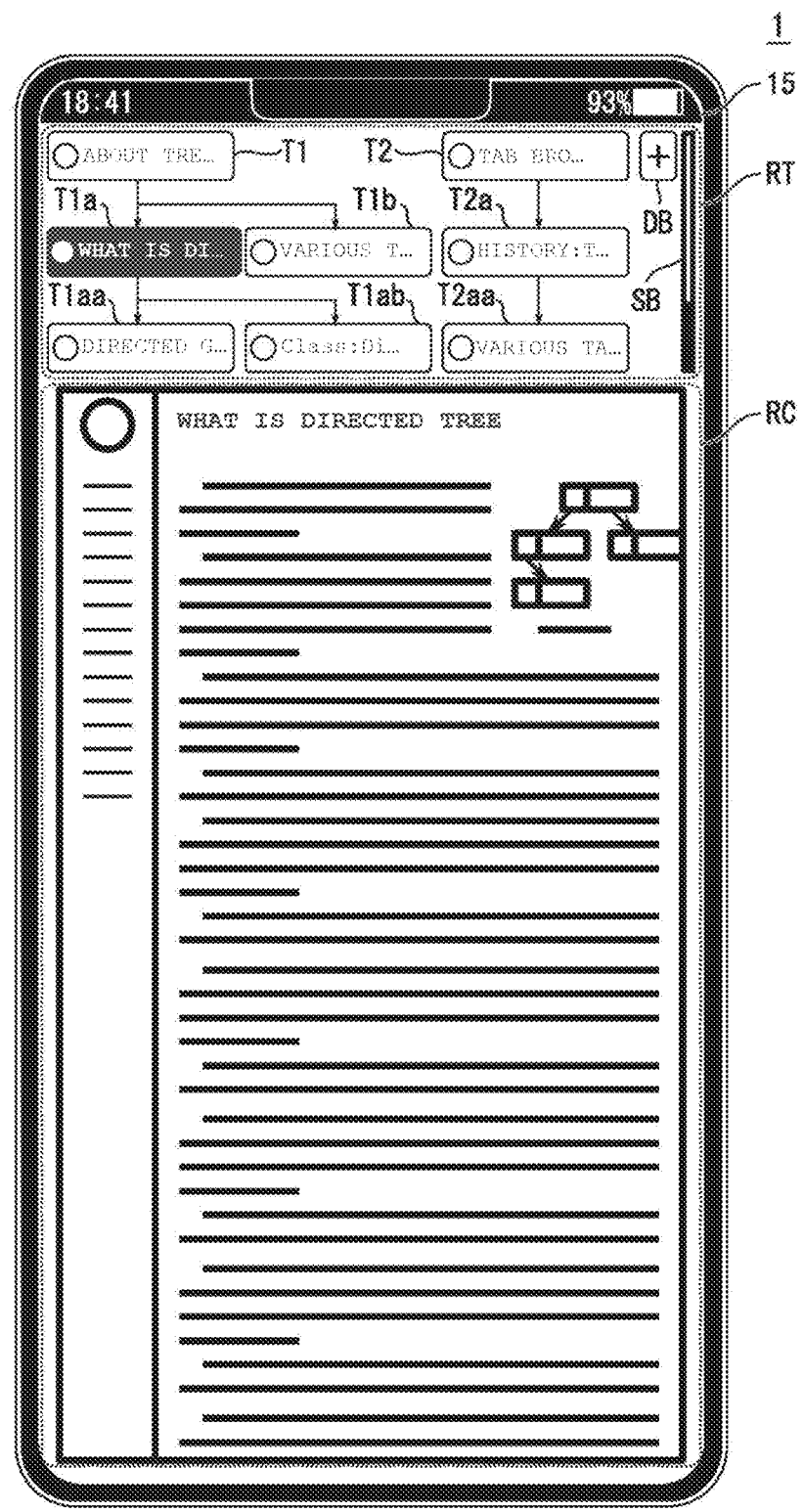
FIG. 5 is a schematic diagram illustrating an example of a screen 15 on which a tab display area RT and a content display area RC are displayed.

FIG. 5 is a schematic diagram illustrating an example of the screen 15 on which the tab display area RT and content display area RC are displayed. In the example of FIG. 5, tabs including text are connected with arrows.

In the example of FIG. 5, each tab is displayed in an identifiable manner using text about the content item associated with the tab. Thereby, the user of the apparatus 1 is able to identify one or more content items using such partial text. Thereby, the user is able to identify the display target tab associated with a display target content item that is desired to be displayed in the content display area RC. The user is then able to select the identified display target tab to display the display target content item in the content display area RC. In addition, in the example of FIG. 5, a small image (for example, "favicon" or the like for web pages) relating to the content item associated with a tab is displayed on the left side of the text. Thereby, the user is also able to identify the content item associated with the tab using the small image.

In the example of FIG. 5, a "collection of trees" is displayed in the tab display area RT on the screen 15, which includes a first "tree" that has a first tab T1 as a root node, a first a tab T1a, a first b tab T1b, a first aa tab T1aa, and a first ab tab T1ab, and a second "tree" that has a second tab T2 as a root node, a second a tab T2a, and a second aa tab T2aa.

In the example of FIG. 5, the first tab T1 and the first a tab T1a that is a child node of the first tab T1 are connected by an arrow-shaped connecting element. Thereby, the user is able to easily grasp that the first a tab T1a is a child node of the first tab T1.

In the example of FIG. 5, the first a tab T1a is displayed in an identifiable manner using a different color from those of the other tabs. Thereby, the user is able to easily grasp that the display target content displayed in the content display area RC is the content item associated with the first a tab T1a.

In the example of FIG. 5, the first a tab T1a is the display target tab associated with the display target content item displayed in the content display area RC. In addition, the tab display area RT displays the first tab T1 corresponding to the parent node of the first a tab T1a, the first b tab T1b corresponding to a sibling node of the first a tab T1a, and the first aa tab T1aa and first ab tab T1ab corresponding to child nodes of the first a tab T1a. Thereby, the user is able to easily select these tabs strongly related to the display target tab.

In the example of FIG. 5, a plurality of tabs (first a tab T1a and first b tab T1b, first aa tab T1aa and first ab tab T1ab, and the like) that are sibling tabs are displayed in a contiguous area that does not have tabs that are not included in the sibling tab set. Thereby, the user has no chance of confusion due to a mixture of the tabs that are included in the sibling tab set and are strongly related to each other and tabs that are not included in the sibling tab set and are weakly related to the tabs included in the sibling tab set. Thereby, the user is able to much more easily identify the strength of the relationship between the content items associated with tabs.

In the example of FIG. 5, the first tab T1, first a tab T1a, first aa tab T1aa that have parent-child relationship in the tree view are arranged in a specific direction from the top toward the bottom of the screen 15. Thereby, the user is able to easily grasp the relationship between these tabs using the specific direction.

In addition, in the example of FIG. 5, tabs at the same hierarchical level in the tree structure are arranged in a direction from the left to the right of the screen 15, which is substantially perpendicular to the specific direction from the top toward the bottom of the screen 15. Thereby, the user is able to easily identify the parent-child relationship between a parent tab and child tabs and the sibling relationship between a plurality of sibling tabs using the arrangement directions. Thus, the user is able to much more easily identify the strength of the relationship between the content items associated with the tabs.

In the example of FIG. 5, the position of displaying the content display area RC is below the tab display area RT on the screen 15. As with many tab browsers, the user is able to select a content item that is desired to be displayed, using the tab display area RT displayed above the content display area RC. Thereby, the user is able to easily select and display a content item that is desired to be displayed, using the tab display area RT.

In the example of FIG. 5, the tab display area RT includes display elements that include a scroll bar SB associated with display of hidden tabs that do not appear in the tab display area RT and a display button DB that is able to display one or more corresponding tabs. By virtue of this, the user is able to request display of a hidden tab that does not appear in the tab display area RT using these display elements. In addition, the user is also able to request display of hidden tabs via various operations such as a swipe operation.

Display Mode of Connecting Tabs Including Text with Speech Bubbles

Figure 6:
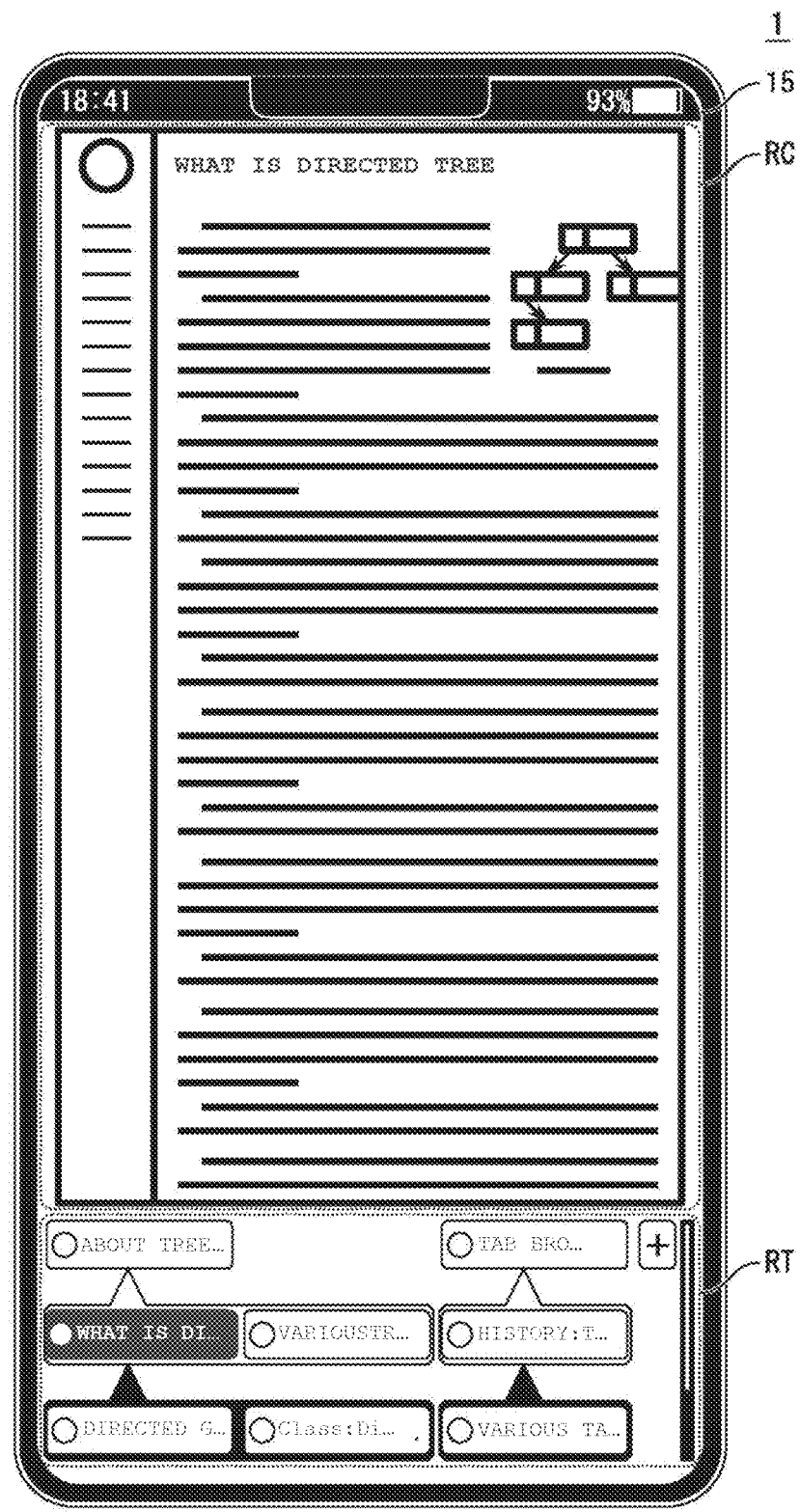
FIG. 6 is a schematic diagram illustrating an example different from that of FIG. 5 in representing the relationship between tabs in a tree view in the tab display area RT.

FIG. 6 is a schematic diagram illustrating an example different from that of FIG. 5 in representing the relationship between tabs in a tree view in the tab display area RT. In the example of FIG. 6, tabs including text are connected with a speech bubble-shaped box indicating a sibling tab set.

In the example of FIG. 6, a plurality of sibling tabs are enclosed by a speech bubble-shaped box indicating a sibling tab set. By virtue of this, the user is able to much more easily identify the strength of the relationship between the content items associated with the tabs using the box.

In the example of FIG. 6, the plurality of sibling tabs are enclosed by the speech bubble-shaped box indicating a sibling tab set and are connected to their parent node using a speech bubble-shaped connecting element. By virtue of this, the user is able to identify the strength of the relationship between the content item associated with the parent tab and the content items associated with its child tabs using the speech bubble-shaped connecting element.

Display Mode of Connecting Tabs Including Thumbnails with Borders

Figure 7:
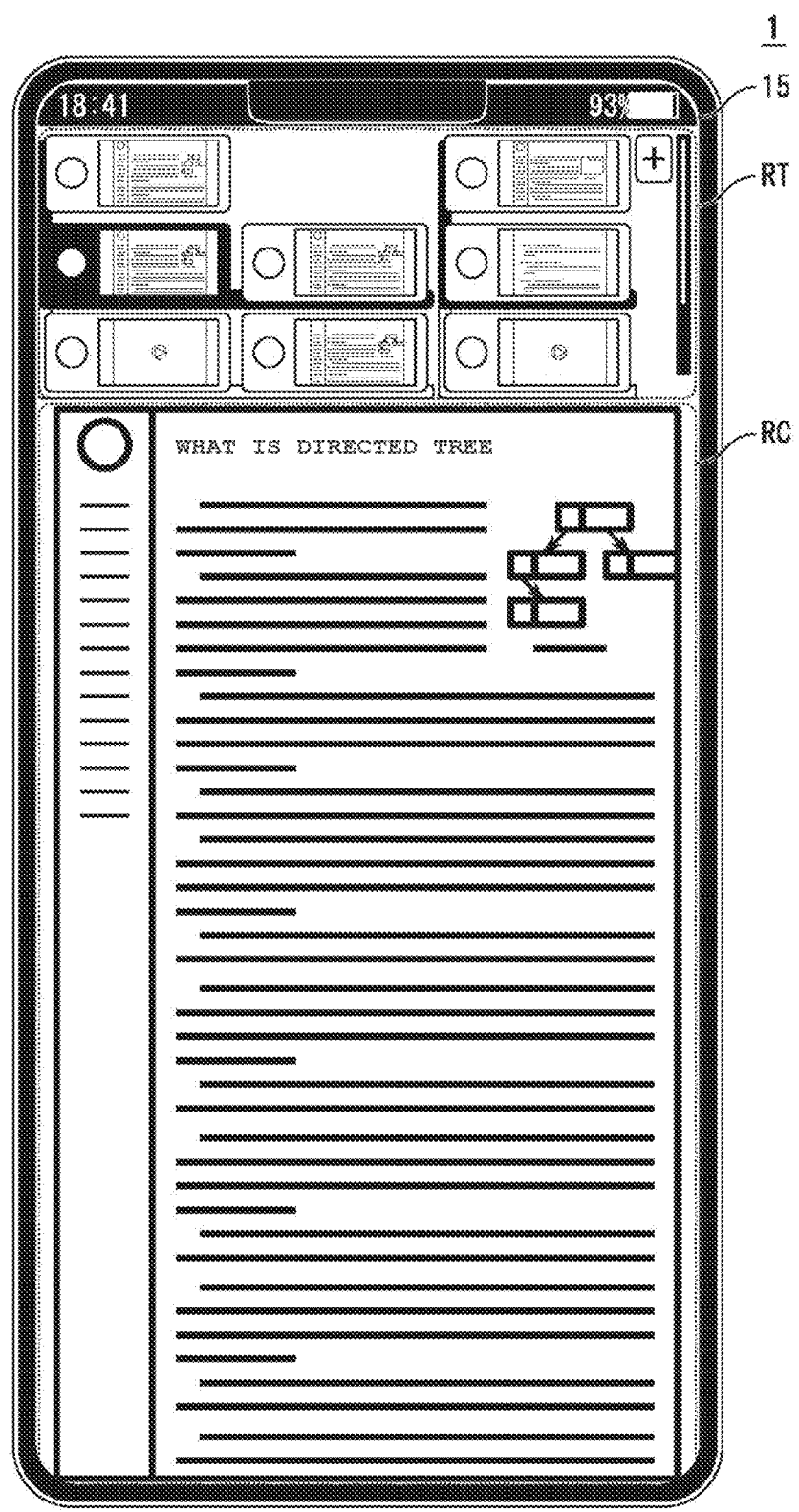
FIG. 7 is a schematic diagram illustrating an example different from those of FIGS. 5 and 6 in representing the relationship between tabs in the tree view in the tab display area RT.

FIG. 7 is a schematic diagram illustrating an example different from those of FIGS. 5 and 6 in representing the relationship between tabs in a tree view in the tab display area RT. In the example of FIG. 7, tabs including thumbnails are connected with a border indicating a sibling tab set.

In the example of FIG. 7, a plurality of sibling tabs are represented by a border indicating a sibling tab set. By virtue of this, the user is able to much more easily identify the strength of the relationship between the content items associated with the tabs using the border.

In the example of FIG. 7, the plurality of sibling tabs are represented by the border indicating a sibling tab set and are connected to their parent node using a connecting element connecting borders. By virtue of this, the user is able to identify the strength of the relationship between the content item associated with the parent tab and the content items associated with its child tabs using the border-shaped connecting element.

In the example of FIG. 7, each tab includes a reduced thumbnail of a content item. By virtue of this, the user of the apparatus 1 is able to identify one or more content items using such thumbnails. Thereby, the user is able to identify the display target tab associated with a display target content item that is desired to be displayed in the content display area RC. The user is then able to select the identified display target tab to display the display target content item in the content display area RC.

Display Mode of Indenting and Displaying Tabs Including Text

Figure 8:
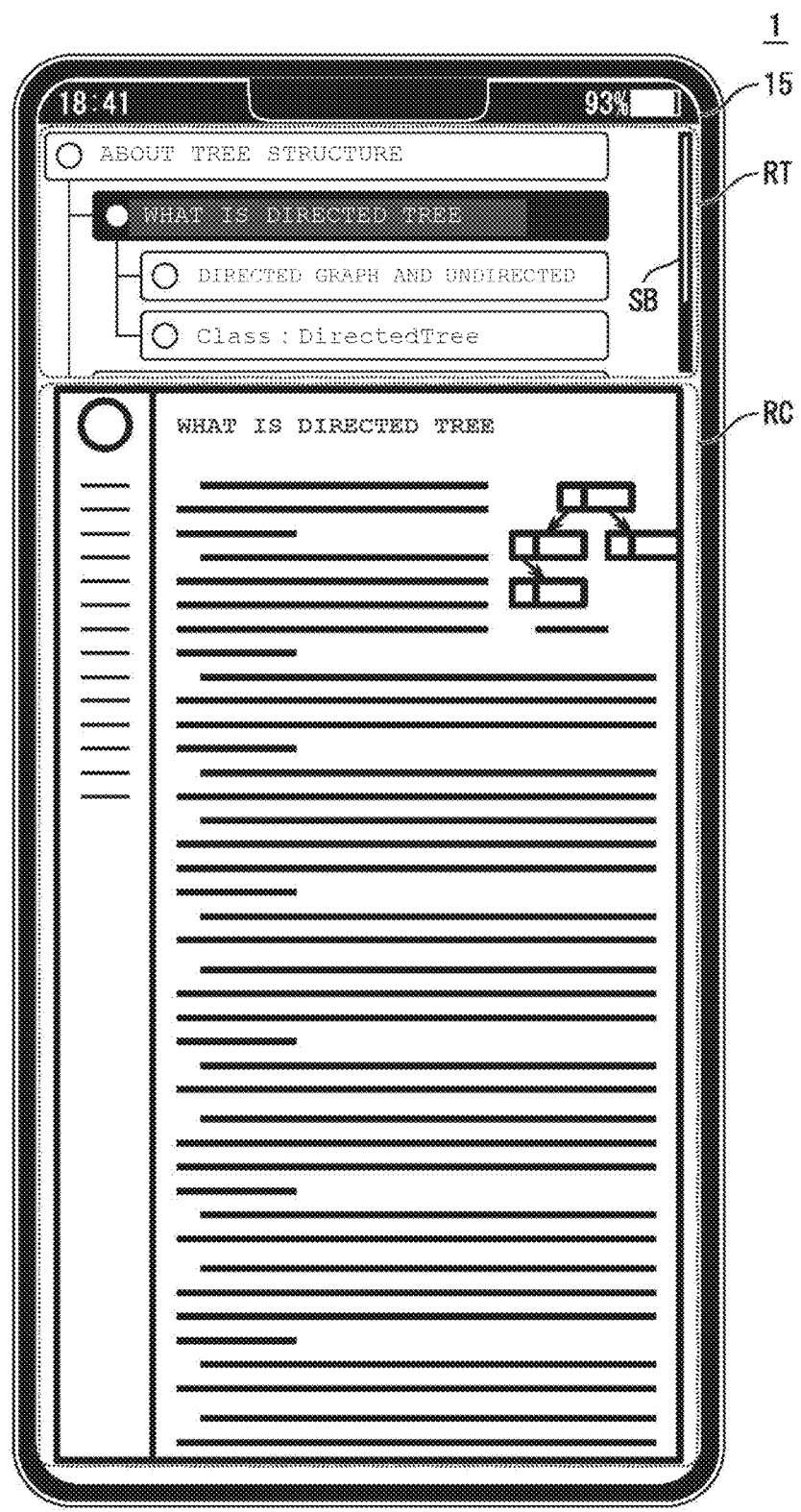
FIG. 8 is a schematic diagram illustrating an example different from those of FIGS. 5 to 7 in representing the relationship between tabs in the tree view in the tab display area RT.

FIG. 8 is a schematic diagram illustrating an example different from those of FIGS. 5 to 7 in representing the relationship between tabs in a tree view in the tab display area RT. In the example of FIG. 8, tabs including text are indented and displayed.

By virtue of this, the user is able to grasp the parent-child relationship and/or sibling relationship between tabs using the indents.

Select and Display Content Item

The user selects the display target tab associated with a display target content item to be displayed in the content display area RC via the tab display area RT. The apparatus 1 then displays the display target content item associated with the display target tab in the content display area RC.

Add Content Item

The user adds a content item. The apparatus 1 then stores the additional content item in the content list 121 and updates the tab display area RT so as to display an additional tab associated with the additional content item.

Figure 9:
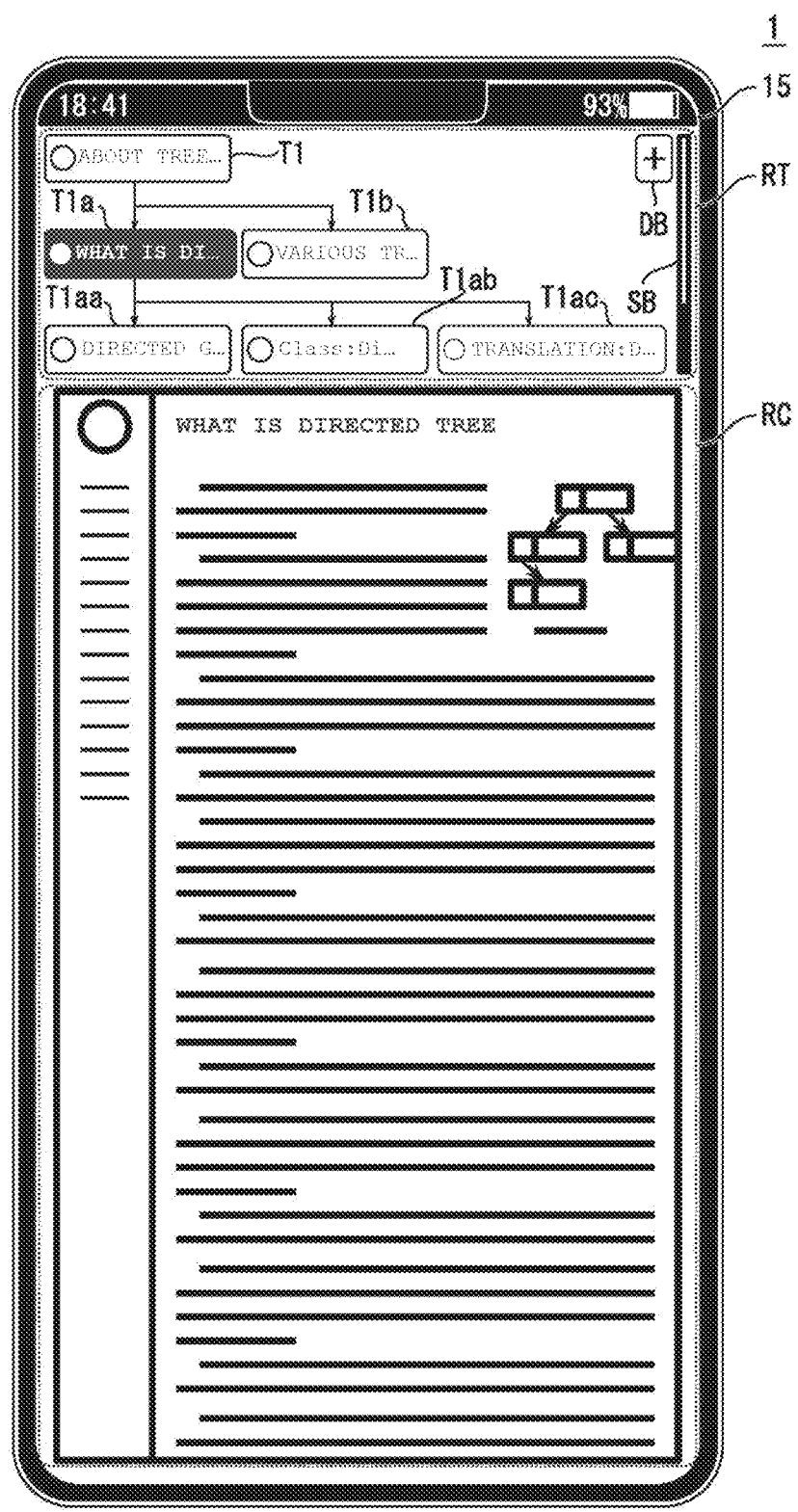
FIG. 9 is a schematic diagram illustrating an example of the screen 15 in a situation where a first ac tab T1*ac* is added in the example of FIG. 5.

FIG. 9 is a schematic diagram illustrating an example of the screen 15 in a situation where an additional content item associated with a first ac tab T1ac is added while the display target content item associated with the first a tab T1a is displayed in the example of FIG. 5. In the example of FIG. 9, the first a tab T1a that is a display target tab having the first aa tab T1aa and the first ab tab T1ab as child nodes in the example of FIG. 5 further has the first ac tab T1ac as a child node.

There is a demand to add another content item related to a content item currently displayed during viewing of the displayed content item. Examples of an additional content item to be added in response to an addition request based on such a demand include a content item that is equivalent to a material related to a display target content item currently displayed, a content item that is provided by the same provider as the content item currently displayed, a content item that is introduced in the content item currently displayed, and other content items. Such an additional content item tends to have stronger relationship with the display target content item than with content items that are not display targets.

When the additional content item associated with the first ac tab T1ac is added while the display target content item associated with the first a tab T1a is displayed in the example of FIG. 5, the apparatus 1 that executes the display control program of the present embodiment updates the display of the screen 15 so that the first a tab T1a that is a display target tab having the first aa tab T1aa and first ab tab T1ab as child nodes in the example of FIG. 5 further has the first ac tab Tac as a child node (FIG. 9).

Thereby, the apparatus 1 is able to represent the strong relationship between the display target content item currently displayed and the additional content item associated with the additional tab using a parent-child relationship in the tree view. The user is then able to easily select such another additional content item related to the display target content item using the parent-child relationship in the tree view. In addition, the user is able to add the additional tab so as to represent the strong relationship with the display target content item, without specifying a specific position and others for adding the additional tab.

Remove Tab and its Descendant Nodes

The user removes a tab and its descendant nodes. The apparatus 1 then removes the removal target content item to be removed and content items corresponding to its descendant nodes from the content list 121 and updates the display of the tab display area RT.

Figure 10:
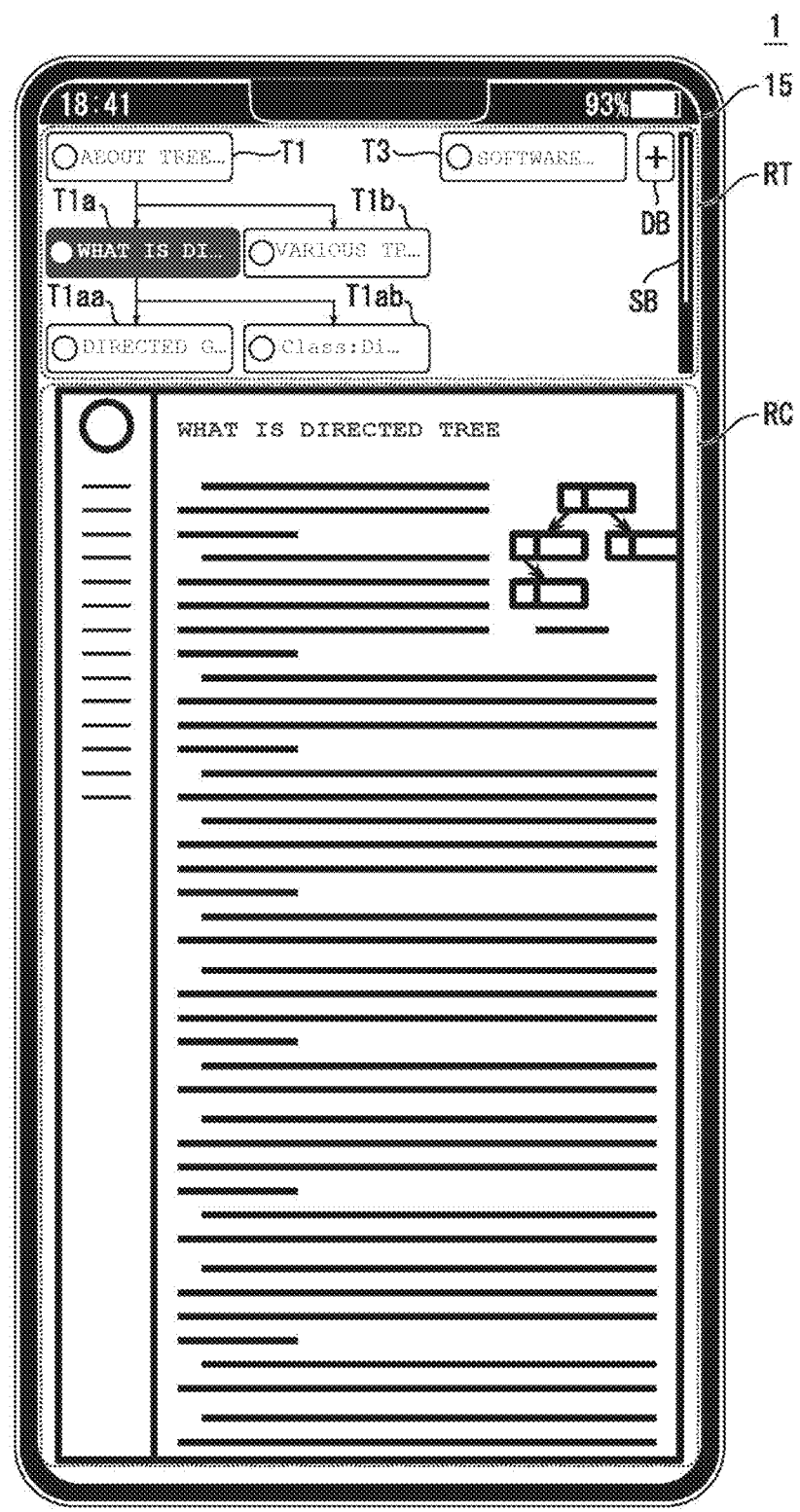
FIG. 10 is a schematic diagram illustrating an example of the screen 15 in a situation where a second tab T2 and others are removed in the example of FIG. 5.

FIG. 10 is a schematic diagram illustrating an example of the screen 15 in a situation where the second tab T2, and the second a tab T2a and second aa tab T2aa that are its descendant nodes in the example of FIG. 5 are removed. In the example of FIG. 10, the second tab T2, and the second a tab T2a and second aa tab T2aa that are its descendant nodes are removed, and a third tab T3 that does not appear in the example of FIG. 5 appears.

There may be a case where many tabs appear in the tab display area RT as a result of repeatedly adding a content item and this rather causes difficulty in grasping the relationship between content items. The apparatus 1 that executes the display control program of the present embodiment is able to remove a tab and its descendant nodes. Thereby, the user is able to perform editing to remove tabs associated with unneeded content items. Thus, the user is able to remove tabs associated with unneeded content items to make it easier to grasp the relationship between content items.

Since the user is able to remove, in addition to a removal target tab, one or more tabs corresponding to the descendant nodes of the removal target tab, the user is able to collectively remove not only the tab associated with the unneeded content item but also tabs corresponding to its descendant nodes strongly related to the removal target tab. Thereby, the user is able to collectively remove a plurality of tabs associated with unneeded content items to make it much easier to grasp the relationship between content items.

The user moves a tab and its descendant nodes. The apparatus 1 then updates the tree structure information on the movement target content item and content items corresponding to its descendant nodes in the content list 121 and updates the display of the tab display area RT.

Figure 11:
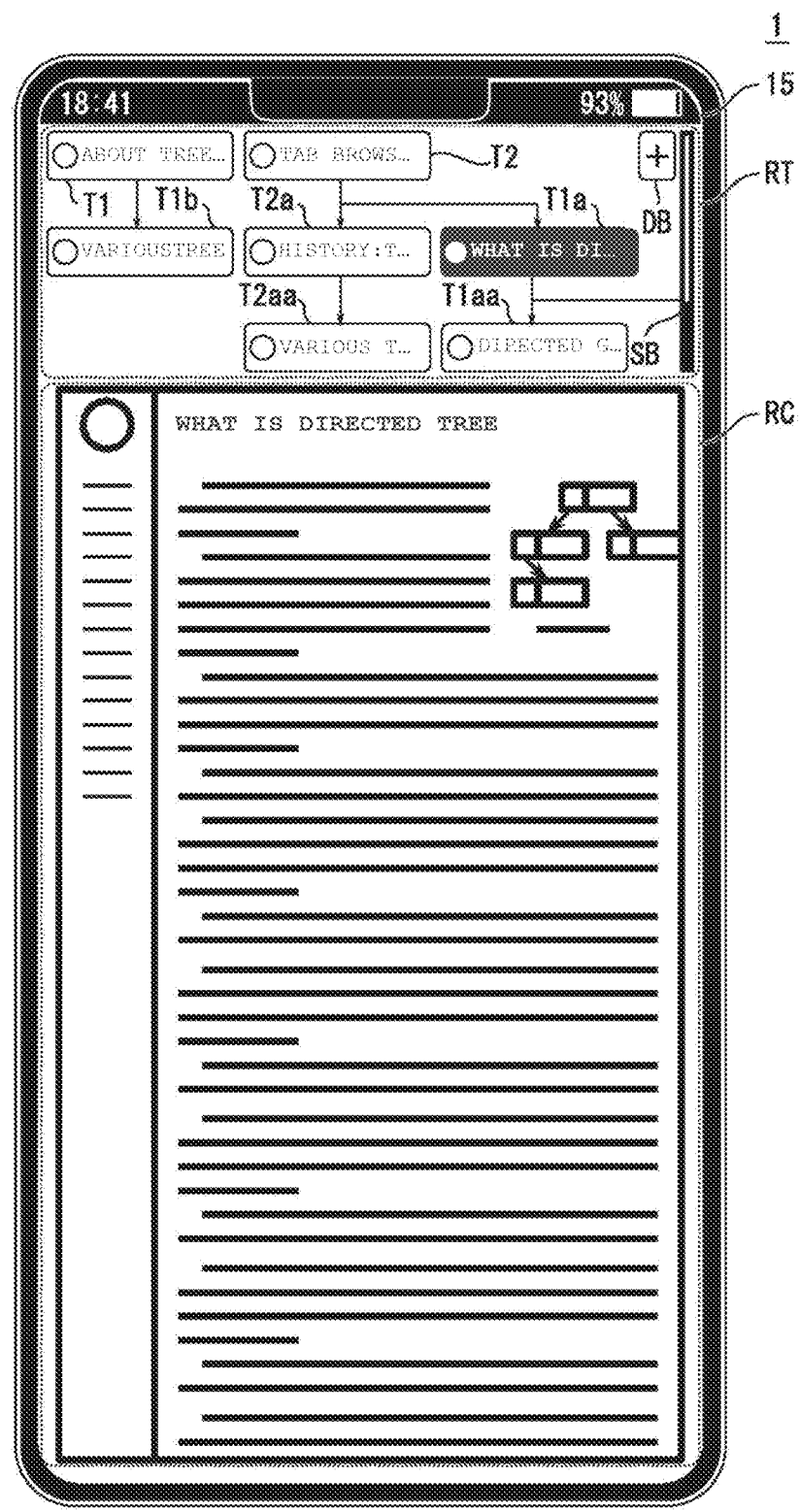
FIG. 11 is a schematic diagram illustrating an example of the screen 15 in a situation where a first a tab T1*a* and others are moved in the example of FIG. 5.

FIG. 11 is a schematic diagram illustrating an example of the screen 15 in a situation where the first a tab T1a and its descendant nodes are moved together to the position of a child node of the second tab T2 in the example of FIG. 5. In the example of FIG. 11, the first a tab T1a and its descendant nodes are moved together to the position of a child node of the second tab T2, so as to thereby indicate that the first a tab T1a and its descendant nodes are strongly related to the second tab T2, not to the first tab T1.

There is a case where, after another content item related to a content item currently displayed is added, the added content item is found to be related to a content item that is not currently displayed. With the apparatus 1 that executes the display control program of the present embodiment, the user is able to perform editing to move the tab associated with a content item strongly related to a content item that is not a display target to an appropriate position.

Since the user is also able to move, in addition to the movement target tab, one or more tabs corresponding to the descendant nodes of the movement target tab, the user is able to collectively move the plurality of tabs associated with a plurality of content items strongly related to a content item that is not a display target to an appropriate position.

Display Hidden Tab

The user displays a hidden tab. The apparatus 1 then updates the display of the tab display area RT so as to display the hidden tab.

Figure 12:
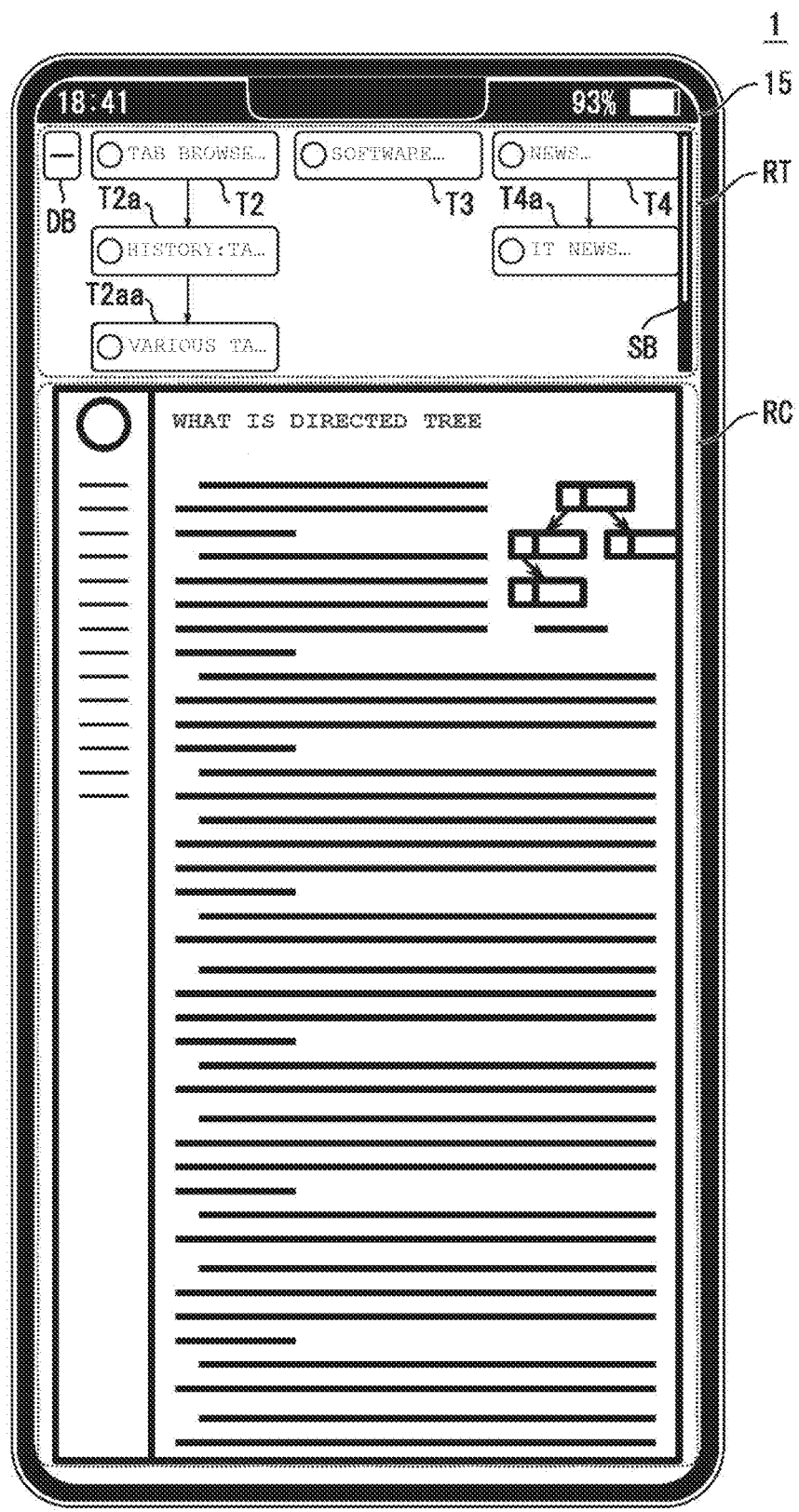
FIG. 12 is a schematic diagram illustrating an example of the screen 15 in a situation where a third tab T3, fourth tab T4, and fourth a tab T4*a* that do not appear in the example of FIG. 5 are displayed.

FIG. 12 is a schematic diagram illustrating an example of the screen 15 in a situation where a third tab T3, fourth tab T4, and fourth a tab T4a that do not appear in the example of FIG. 5 are displayed. In the example of FIG. 12, the third tab T3, fourth tab T4, and fourth a tab T4a that do not appear in the example of FIG. 5 are displayed in response to an input operation using the display button DB in the example of FIG. 5.

There may be a case where many tabs associated with content items are created as a result of repeatedly adding a content item and therefore the tab display area RT is not able to display all the tabs. With the apparatus 1 that executes the display control program of the present embodiment, the user is able to display a hidden tab that does not appear in the tab display area RT. Therefore, even in the case where all tabs do not appear in the tab display area RT, the user is able to display and select a hidden tab that does not appear in the tab display area RT.

In the examples of FIGS. 5 to 12, the content items include web pages such as the content item associated with the first tab T1, the content item associated with the first a tab T1a, the content item associated with the first b tab T1b, the content item associated with the first ab tab T1ab, and others.

A tab browser is used, which is able to display a plurality of web pages given tabs within one window. The tab browser displays tabs associated with information contained in the web pages. Then, in response to a certain tab being selected, the tab browser displays the web page associated with the selected tab.

The tab browser that is able to obtain web pages from a vast number of webpages available on a network may display much more web pages than displaying only offline content items. Therefore, the tab browser rather causes difficulty in grasping the relationship between these web pages, compared with the case of displaying only offline content items.

With the apparatus 1 for content items including web pages, the user of the apparatus 1 is able to select any tab displayed in a tree view in the tab display area RT to display a web page or the like associated with the selected display target tab in the content display area RC. Thus, the user is able to easily grasp the relationship between web pages and others using the tree view, which is suitable to represent the hierarchical structure of a plurality of elements. The user is then able to easily select and display another web page or the like related to the display target web page or the like, on the basis of the relationship between web pages grasped using the tree view.

By the way, in the case where a display target content item is a web page, it is often demanded to add another web page related to the web page currently displayed during viewing of the displayed web page. Examples of a web page to be added in response to an addition request based on such a demand include a web page that is equivalent to a material related to a web page currently displayed, a web page that is provided by the same provider as the web page currently displayed, a web page that is introduced in the web page currently displayed, and other web pages. Such a web page is more strongly related to the web page currently displayed than to web pages that are not currently displayed.

The apparatus 1 used for content items including web pages is able to update the display of the tab display area RT so as to include an additional tab as a child node of the display target tab in a tree view to thereby represent the strong relationship between the web page currently displayed and the web page associated with the additional tab using a parent-child relationship in the tree view. The user is then able to easily select such another additional web page related to the display target web page using the parent-child relationship in the tree view. In addition, the user is also able to add the additional tab such as to represent the strong relationship with the web page currently displayed, without specifying a specific position and others for adding the additional tab.

As described above, the display control program of the present embodiment that is usable for content items including web pages is able to provide a tab browser that makes it easy to grasp the relationship between web pages using a tree view and also to add, select, and display another web page related to a display target web page.

According to one aspect, the present disclosure makes it easy to grasp the relationship between a plurality of content items such as web pages and also to add, select, and display another content item related to a display target content item.

All examples and conditional language provided herein are intended for the pedagogical purposes of aiding the reader in understanding the present disclosure and the concepts contributed by the present disclosure to further the art, and are not to be construed as limitations to such specifically recited examples and conditions, nor does the organization of such examples in the specification relate to a showing of the superiority and inferiority of the present disclosure. Although one or more embodiments of the present disclosure have been described in detail, it should be understood that various changes, substitutions, and alterations could be made hereto without departing from the spirit and scope of the present disclosure.

The invention claimed is:

1. A non-transitory computer-readable storage medium storing a display control program that causes a computer that is able to control a screen to:
   display, on the screen, a tab display area and a content display area, wherein the tab display area displays one or more tabs in a tree view, wherein the one or more tabs are associated with one or more content items, and wherein the content display area displays any of the one or more content items;
   display in the content display area, in response to a display target tab being selected from the one or more tabs, a display target content item associated with the display target tab;
   update, in response to an addition request to add an additional content item, the tab display area to display an additional tab associated with the additional content item,
   wherein the updating displays the additional tab as a child node of the display target tab in the tree view,
   wherein the displaying the tab display area arranges a parent tab that is a tab associated with a content item corresponding to a parent node of the display target content item associated with the display target tab, the display target tab, and a child tab that is a tab associated with a content item corresponding to a child node of the display target content item associated with the display target tab in a first direction in the tree structure and arranges the display target tab and a sibling tab that is a tab associated with a content item sharing the parent node with the display target content item associated with the display target tab in a second direction substantially perpendicular to the first direction in the tree structure;
   edit a tree structure of the tree view by moving a movement target tab and one or more tabs corresponding to one or more descendant nodes of the movement target tab in the tree structure, wherein the moving changes a parent-descendent relationship of the movement target tab; and
   store, in a memory, a content list associating a node identification value, a node parent identification value, and a node child identification value for each of the one or more content items, wherein the node identification value directly identifies the parent-descendant relationship for a node corresponding to the content item of the node identification value.

2. The non-transitory computer-readable storage medium of claim 1, wherein the editing removes a removal target tab and one or more tabs corresponding to one or more descendant nodes of the removal target tab in the tree structure.

3. The non-transitory computer-readable storage medium of claim 1, wherein the display control program further causes the screen to:
update the display of the tab display area to display a hidden tab that does not appear in the tab display area.

4. The non-transitory computer-readable storage medium of claim 1, wherein the one or more content items include one or more web pages.

5. The non-transitory computer-readable storage medium of claim 1, wherein the updating does not change the display target tab or the display content item displayed in the content area.

6. A method of controlling a computer with a screen, the method comprising:
displaying, on the screen, a tab display area and a content display area, wherein the tab display area displays one or more tabs in a tree view, wherein the one or more tabs are associated with one or more content items, and wherein the content display area displays any of the one or more content items;
displaying in the content display area, in response to a display target tab being selected from the one or more tabs, a display target content item associated with the display target tab;
updating, in response to an addition request to add an additional content item, the tab display area to display an additional tab associated with the additional content item, wherein the updating displays the additional tab as a child node of the display target tab in the tree view, wherein the displaying the tab display area arranges a parent tab that is a tab associated with a content item corresponding to a parent node of the display target content item associated with the display target tab, the display target tab, and a child tab that is a tab associated with a content item corresponding to a child node of the display target content item associated with the display target tab in a first direction in the tree structure and arranges the display target tab and a sibling tab that is a tab associated with a content item sharing the parent node with the display target content item associated with the display target tab in a second direction substantially perpendicular to the first direction in the tree structure;
editing a tree structure of the tree view by moving a movement target tab and one or more tabs corresponding to one or more descendant nodes of the movement target tab in the tree structure; and
storing, in a memory, a content list associating a node identification value, a node parent identification value, and a node child identification value for each of the one or more content items, wherein the node identification value directly identifies the parent-descendant relationship for a node corresponding to the content item of the node identification value.

7. The method of claim 6, wherein the updating does not change the display target tab or the display content item displayed in the content area.

8. A display control apparatus that is able to control a screen, the display control apparatus comprising:
a processor configured with instructions to,
display, on the screen, a tab display area and a content display area, wherein the tab display area displays one or more tabs in a tree view, wherein the one or more tabs are associated with one or more content items, and wherein the content display area displays any of the one or more content items,
display in the content display area, in response to a display target tab being selected from the one or more tabs, a display target content item associated with the display target tab,
update, in response to an addition request to add an additional content item, the tab display area to display an additional tab associated with the additional content item, wherein the updating displays the additional tab as a child node of the display target tab in the tree view, wherein the displaying the tab display area arranges a parent tab that is a tab associated with a content item corresponding to a parent node of the display target content item associated with the display target tab, the display target tab, and a child tab that is a tab associated with a content item corresponding to a child node of the display target content item associated with the display target tab in a first direction in the tree structure and arranges the display target tab and a sibling tab that is a tab associated with a content item sharing the parent node with the display target content item associated with the display target tab in a second direction substantially perpendicular to the first direction in the tree structure,
edit a tree structure of the tree view by moving a movement target tab and one or more tabs corresponding to one or more descendant nodes of the movement target tab in the tree structure, and
store, in a memory, a content list associating a node identification value, a node parent identification value, and a node child identification value for each of the one or more content items, wherein the node identification value directly identifies the parent-descendant relationship for a node corresponding to the content item of the node identification value.

9. The display control apparatus of claim 8, wherein the processor is further configured with instructions to not change the display target tab or the display content item displayed in the content area during the updating.

* * * * *